United States Patent
Saban et al.

(10) Patent No.: US 9,485,803 B2
(45) Date of Patent: *Nov. 1, 2016

(54) RADIO-FREQUENCY INTEGRATED CIRCUIT (RFIC) CHIP(S) FOR PROVIDING DISTRIBUTED ANTENNA SYSTEM FUNCTIONALITIES, AND RELATED COMPONENTS, SYSTEMS, AND METHODS

(71) Applicant: Corning Optical Communications Wireless Ltd, Airport (IL)

(72) Inventors: Ofer Saban, Vienna, VA (US); Isaac Shapira, Petach Tikva (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,389

(22) Filed: Apr. 25, 2016

(65) Prior Publication Data

US 2016/0242236 A1    Aug. 18, 2016

Related U.S. Application Data

(63) Continuation of application No. 14/486,387, filed on Sep. 15, 2014, now Pat. No. 9,338,823, which is a continuation of application No. PCT/US2013/033253, filed on Mar. 21, 2013.

(60) Provisional application No. 61/614,831, filed on Mar. 23, 2012.

(51) Int. Cl.
*H04B 1/02* (2006.01)
*H04M 1/00* (2006.01)
(Continued)

(52) U.S. Cl.
CPC .... *H04W 88/085* (2013.01); *H04L 2012/6459* (2013.01)

(58) Field of Classification Search
CPC .................................................. H04W 88/085
USPC .......................... 455/525, 524, 452.1, 562.1
See application file for complete search history.

(56) References Cited

U.S. PATENT DOCUMENTS

| | | | |
|---|---|---|---|
| 7,813,451 B2 * | 10/2010 | Binder | H04B 7/15542 307/424 |
| 8,175,649 B2 * | 5/2012 | Saban | H04W 4/20 455/524 |
| 9,160,449 B2 * | 10/2015 | Heidler | H04B 10/11 |

(Continued)

OTHER PUBLICATIONS

Rappaport, et al., "Millimeter-Wave and Terahertz Wireless RFIC and On-Chip Antenna Design: Tools and Layout Techniques," Proceedings of IEEE First Workshop on Millimeter Wave and Terahertz Communications, in conjunction with IEEE Global Communications Conference (Globecom), Honolulu, HI ,Nov. 30-Dec. 4, 2009, 7 pages.

*Primary Examiner* — Tilahun B Gesesse
(74) *Attorney, Agent, or Firm* — C. Keith Montgomery

(57) ABSTRACT

Radio-frequency (RF) integrated circuit (RFIC) chip(s) allow for the integration of multiple electronic circuits on a chip to provide distributed antenna system functionalities. RFIC chips are employed in central unit and remote unit components, reducing component cost and size, increasing performance and reliability, while reducing power consumption. The components are also easier to manufacture. The RFIC chip(s) can be employed in distributed antenna systems and components that support RF communications services and/or digital data services.

14 Claims, 18 Drawing Sheets

(51) Int. Cl.
*H04W 88/08* (2009.01)
*H04L 12/64* (2006.01)

(56) References Cited

U.S. PATENT DOCUMENTS

| | | | | |
|---|---|---|---|---|
| 9,184,960 | B1* | 11/2015 | Harel | H04L 25/03006 |
| 9,252,874 | B2* | 2/2016 | Heidler | H04B 10/11 |
| 2007/0264009 | A1* | 11/2007 | Sabat, Jr. | H04B 10/1127 |
| | | | | 398/5 |
| 2011/0281536 | A1* | 11/2011 | Lee, II | H04B 7/0613 |
| | | | | 455/129 |
| 2012/0329407 | A1* | 12/2012 | Rousu | H01Q 3/2605 |
| | | | | 455/90.2 |
| 2013/0235851 | A1* | 9/2013 | Abu-Surra | H04W 56/00 |
| | | | | 370/336 |
| 2013/0244722 | A1* | 9/2013 | Rousu | H04B 1/0057 |
| | | | | 455/552.1 |
| 2013/0252664 | A1 | 9/2013 | Haralabidis et al. | |
| 2013/0337789 | A1 | 12/2013 | Johnson | |
| 2014/0077876 | A1 | 3/2014 | Feygin et al. | |
| 2014/0162570 | A1* | 6/2014 | Lin | H04B 1/0064 |
| | | | | 455/73 |
| 2014/0293894 | A1* | 10/2014 | Saban | H04W 88/085 |
| | | | | 370/329 |

* cited by examiner

RADIO-FREQUENCY INTEGRATED CIRCUIT (RFIC) CHIP(S) FOR PROVIDING DISTRIBUTED ANTENNA SYSTEM FUNCTIONALITIES, AND RELATED COMPONENTS, SYSTEMS, AND METHODS

PRIORITY APPLICATION

This application is a continuation of U.S. patent application Ser. No. 14/486,387, filed Sep. 15, 2014, which is a continuation of International Application No. PCT/US13/33253, filed Mar. 21, 2013, which claims the benefit of priority to U.S. Provisional Application No. 61/614,831, filed Mar. 23, 2012 the contents of which are relied upon and incorporated herein by reference in their entireties.

BACKGROUND

1. Field of the Disclosure

The technology of the disclosure relates to distributed antenna systems configured to provide communications signals over a communications medium to and from one or more remote access units for communicating with client devices.

2. Technical Background

Wireless communication is rapidly growing, with ever-increasing demands for high-speed mobile data communication. As an example, local area wireless services (e.g., "wireless fidelity" or "WiFi" systems) and wide area wireless services are being deployed in many different types of areas. Distributed communications or antenna systems communicate with wireless devices called "clients," "client devices," or "wireless client devices," within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from sources such as base stations. Applications where distributed antenna systems can provide wireless services include public safety, cellular telephony, wireless LANs, location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The RUs operate one or more antennas configured to support the desired frequency(ies) or polarization to provide the antenna coverage areas. Typical antenna coverage areas can have a radius in the range from a few meters to up to twenty meters. Combining a number of RUs creates an array of antenna coverage areas. Because the antenna coverage areas each cover small areas, there typically may be only a few users (clients) per antenna coverage area. This arrangement generates a uniform high quality signal enabling high throughput for the wireless system users.

Distributed antenna systems can be configured to serve a single wireless service or a combination of many wireless services operating over multiple radio bands. Different communications mediums can be employed for distributing RF signals to the RUs, such as electrical conductors (e.g., twisted pair wires, coaxial cables), optical fibers, and wireless transmissions. Distributed antenna systems can be employed in existing distributed communications systems where wireless signals are distributed over the same cabling as provided between a hub and access points (APs) in the distributed wireless communications systems.

As the wireless industry evolves, distributed antenna systems have become more sophisticated. Distributed antenna systems may require more complex electronic circuits to enable better use of limited bandwidths and to provide additional functionality. For example, electronic circuits may be employed for additional functionalities, such as interference reduction, increased output power, handling high dynamic range, and signal noise reduction. Further, the functionality of a remote unit may be included in an AP in a distributed wireless communications system. It may be desired to provide remote unit functionality in APs in a distributed wireless communications system without changing or enlarging the form factor of the APs.

SUMMARY OF THE DETAILED DESCRIPTION

Embodiments disclosed herein include radio-frequency (RF) integrated circuit (IC) (RFIC) chip(s) for providing distributed antenna system functionalities. Related distributed antenna components, systems, and methods are also disclosed. Providing distributed antenna system functionalities in RFIC chips can allow integration of multiple electronic circuits that provide multiple functionalities in a single RFIC chip or reduced RFIC chip set. Cost reductions, size reduction, increase performance, increased reliability, reduction in power consumption, and improved manufacturability in distributed antenna system electronic circuits and components are non-limiting examples of advantages that may be realized by providing RFICs in distributed antenna system components. As an example, the RFIC chip(s) can be employed in a central unit that receives communication signals of communications services for providing to remote units (RUs). As another example, the RFIC chip(s) can be employed in the remote units that provide received communications signals from the central unit to client devices. As another example, the RFIC chip(s) can be employed in distributed antenna systems and components that support RF communications services and/or digital data services.

In one embodiment, a central unit for providing communications signals in a distributed antenna system comprises a RF communications interface. The RF communications interface is configured to receive downlink RF communication signals at a RF communications frequency for a RF communications service, and to provide uplink RF communication signals at the RF communications frequency for the RF communications service. The central unit also comprises at least one RFIC chip comprising at least one of a first frequency conversion circuitry configured to shift a frequency of the downlink RF communication signals to an IF having a different frequency than the RF communications frequency (e.g., lower or higher), to provide downlink IF communications signals, and a second frequency conversion circuitry configured to shift the frequency of uplink IF communication signals to the RF communications frequency to provide the uplink RF communications signals.

In another embodiment, a method for providing communications signals in a central unit comprises receiving downlink RF communication signals at a RF communications frequency for a RF communications service in a communications interface. The method also comprises receiving uplink RF communication signals at the RF communications frequency for the RF communications service in the communications interface, shifting a frequency of the downlink RF communication signals to an intermediate frequency (IF)

having a different frequency than the RF communications frequency, to provide downlink IF communications signals in a first frequency conversion circuitry, and shifting the frequency of uplink IF communication signals to the RF communications frequency to provide the uplink RF communications signals in a second frequency conversion circuitry. The method also comprises at least one of the first frequency conversion circuitry and the second frequency conversion circuitry provided in at least one RFIC chip.

In another embodiment, a remote unit for providing received communications signals in a distributed antenna system comprises a RF communications interface. The RF communications interface is configured to receive downlink IF communication signals at an IF for a RF communications service over a communications medium from a central unit. The RF communications interface is also configured to receive uplink RF communication signals at a RF communications frequency for the RF communications service. The RU further comprises at least one RFIC chip comprising at least one of a first frequency conversion circuitry configured to shift a frequency of downlink IF communication signals to a RF communications frequency of RF communications service to radiate downlink RF communications signals over a first antenna element, and a second frequency conversion circuitry configured to shift the frequency of uplink RF communication signals received from a second antenna element to the IF to provide uplink IF communications signals.

In another embodiment, a method of providing received communications signals in a RU is provided. The method comprises receiving downlink IF communication signals at an IF for a RF communications service in a RF communications interface. The method also comprises receiving uplink RF communication signals at a RF communications frequency for the RF communications service in a RF communications interface, and shifting a frequency of downlink IF communication signals to the RF communications frequency of the RF communications service in a first frequency conversion circuitry provided in at least one RFIC chip, to radiate downlink RF communications signals over a first antenna element. The method also comprises shifting the frequency of uplink RF communication signals received from a second antenna element to the IF in a second frequency conversion circuitry provided in the RFIC chip, to provide uplink IF communications signals.

In another embodiment, a distributed antenna system comprises one or more remote units (RUs), and a central unit having a central unit radio-frequency (RF) communications interface. The central unit RF communications interface is configured to receive downlink RF communication signals at a RF communications frequency for a RF communications service, and to receive uplink RF communication signals at the RF communications frequency for the RF communications service. The central unit also comprises a down conversion RFIC chip that comprises down conversion circuitry configured to shift the frequency of the downlink RF communication signals to an intermediate frequency having a different (e.g., lower or higher) frequency than the RF communications frequency, to provide downlink IF communications signals. The central unit also comprises an up conversion RFIC chip having up conversion circuitry configured to shift the frequency of uplink IF communication signals to the RF communications frequency to provide the uplink RF communications signals. The central unit also comprises a central unit communications interface comprising communications circuitry. The communications circuitry is configured to receive the downlink IF communication signals and provide the downlink IF communications signals to one or RUs over a communications medium, and to receive the uplink IF communication signals from the one or more RUs over the communications medium and provide the uplink IF communication signals to the up conversion RFIC chip. The one or more RUs each comprise a RU communications interface configured to receive the downlink IF communication signals from the central unit for the RF communications service. The RU communications interface is also configured to receive uplink RF communication signals at a RF communications frequency for the RF communications service. The one or more RUs also each comprise an up conversion RFIC chip having up conversion circuitry configured to shift the frequency of downlink IF communication signals to the RF communications frequency to radiate the downlink RF communications signals over a first antenna element. The one or more RUs also each comprise a down conversion RFIC chip having down conversion circuitry configured to shift the frequency of uplink RF communication signals received from a second antenna element to the IF to provide the uplink IF communications signals.

The central units and RUs can support both RF communication services and digital data services. These services can be wired or wireless communications services that are typically communicated wirelessly, but may be provided over non-wireless medium (e.g., electrical conductor and/or optical fiber). The RF communication services and digital data services can be provided over any type of communications medium, including electrical conductors and optical fiber to wireless client devices, such as remote units for example. Examples of digital data services include LAN using Ethernet, WLAN, WiMax, WiFi, Digital Subscriber Line (DSL), telephony, WCDMA, and LTE, which can support voice and data. Digital data signals can be provided over separate communications media or a common medium for providing RF communication services.

Additional features and advantages will be set forth in the detailed description, and in part will be readily apparent to those skilled in the art from that description or recognized by practicing the embodiments as described herein.

The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include radio-frequency (RF) integrated circuit (RFIC) chip(s) for providing distributed antenna system functionalities. Related distributed antenna elements, systems, and methods are also disclosed. Providing distributed antenna system functionalities in RFIC chips can allow integration of multiple electronic circuits that provide multiple functionalities in a single RFIC chip or reduced RFIC chip set. Cost reductions, size reduction, increased performance, increased reliability, reduction in power, and improved manufacturability in distributed antenna system electronic circuits and components are non-limiting examples of advantages that may be realized by providing RFICs in distributed antenna system components. As one example, the RFIC chip(s) can be employed in a central unit that receives communication signals of communications services for providing to remote units (RUs). As another example, the RFIC chip(s) can be employed in the RUs that provide received communications signals from the central unit to client devices. As another example, the RFIC chip(s) can be employed in distributed antenna systems and components that support RF communications services and/or digital data services.

Figure 1:
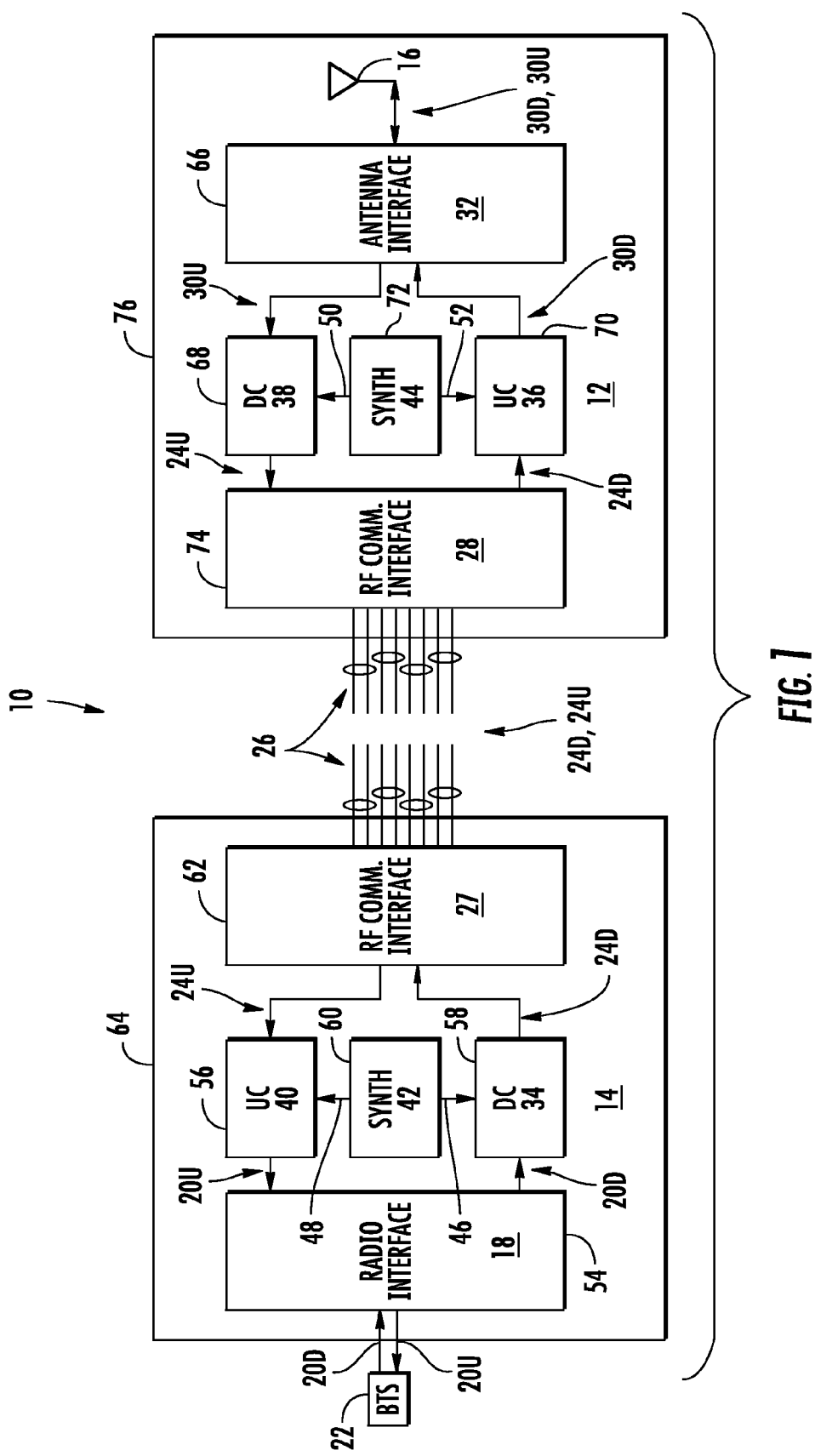
FIG. 1 is a schematic diagram of an exemplary single radio band distributed radio-frequency (RF) antenna system employing RF integrated circuit (RFIC) chips for providing RF communications services to remote units (RUs)

In this regard, FIG. 1 is a schematic diagram of an exemplary single radio band distributed radio-frequency (RF) antenna system 10 employing RF integrated circuit (RFIC) chips for providing RF communications services. The distributed antenna system 10 is configured to create one or more antenna coverage areas for establishing communications with wireless client devices located in the RF range of the antenna coverage areas created by remote units (RUs) 12. The remote units 12 may also be termed "remote antenna units" if they contain one or more antennas to support wireless communications. The distributed antenna system 10 provides any type of RF communication services desired, for example cellular radio services as a non-limiting example. In this embodiment, the distributed antenna system 10 includes a central unit 14, one or more RUs 12, and a communications medium 26 that communicatively couples the central unit 14 to the RU 12. The central unit is configured to provide RF communication services to the RU 12 for wireless propagation to client devices in communication range of an antenna 16 of the RU 12. The RU 12 may also be configured to support wired communications services. Note that although only one RU 12 is illustrated as being communicatively coupled to the central unit in FIG. 1, a plurality of RUs 12 can be communicatively coupled to the central unit 14 to receive RF communication services from the central unit 14.

With continuing reference to FIG. 1, the central unit 14 includes a radio interface 18 (or RF interface) that is configured to receive downlink RF communication signals 20D for RF communication services to be provided to the RU 12. For example, the RF communications service may be a cellular radio service, but could also be any other type of RF communications service. The radio interface 18 may receive the downlink RF communications signals 20D to be provided to the RU 12 from a base transceiver station (BTS) 22. As will be discussed in more detail below, the central unit 14 is configured to provide downlink RF communication signals 24D through a communications interface 27 to provide the RF communication services based on the downlink RF communications signals 20D over a communications medium 26 to the RU 12. The communications interface 27 could include a cable interface that interfaces with a cable medium (e.g., coaxial cable, fiber optic cable) for sending and receiving communications signals. The RU 12 includes a communications interface 28 configured to receive the downlink RF communication signals 24D and provide downlink RF communication signals 30D providing the RF communications services to an antenna interface 32. The antenna 16 electrically coupled to the antenna interface 32 is configured to wirelessly radiate the downlink RF communication signals 30D to wireless clients in wireless communication range of the antenna 16. The communications interface 28 could include a cable interface that interfaces with a cable medium (e.g., coaxial cable, fiber optic cable) for sending and receiving communications signals, including the downlink RF communication signals 30D.

The downlink RF communication signals 24D, 30D may be the same signals as the downlink RF communication signals 20D. Alternatively, as provided in the distributed antenna system 10 of FIG. 1, the downlink RF communications signals 20D are frequency shifted by down converter circuitry (DC) 34 to provide downlink RF communications signals 24D. The downlink RF communications signals 20D are downconverted to the downlink communications signals 24D to an intermediate frequency (IF) different from (e.g., lower or higher than) the frequency of downlink communications signals 20D. To recover the downlink RF communication signals 20D at the RU 12 to be radiated by the antenna 16, an up converter circuitry (UC) 36 is provided in the RU 12 to up convert the downlink RF communications signals 24D to the downlink RF communications signals 30D. The downlink RF communication signals 30D are of the same or substantially the same frequency as the downlink RF communications signals 20D in this embodiment. The downlink RF communication signals 30D may be frequency locked to the downlink RF communications signals 20D, such as through employing a frequency correction circuit in the UC 36. The downlink RF communication signals 30D may be phase locked to the downlink RF communications signals 20D, such as through employing a phase locked loop (PLL) circuit in the UC 36 as another non-limiting example.

With continuing reference to FIG. 1, the radio interface 18 is also configured to receive uplink RF communication signals 20U to provide uplink communications received at the RU 12 from wireless client devices to the central unit 14. In this regard, the radio interface 18 receives the uplink RF communications signals 24U from the RU 12 via the communications interfaces 28, 27 in the RU 12 and central unit 14, respectively. The RU 12 is configured to provide the uplink RF communication signals 24U through the communications interface 28 to provide uplink communications for the RF communication services over the communications medium 26 to the communications interface 27 of the central unit 14. The uplink RF communication signals 24D are based on the uplink RF communication signals 30U received by the antenna 16 of the RU 12 from wireless client devices. The uplink RF communication signals 24U may be the same signals as the uplink RF communication signals 30U.

Alternatively, with continuing reference to FIG. 1, the downlink RF communications signals 24D are frequency shifted by down converter circuitry (DC) 38 in the RU 12 to provide uplink RF communications signals 24U. The uplink RF communications signals 30U are downconverted to the uplink communications signals 24U to an intermediate frequency (IF) that is different from the frequency of downlink communications signals 30U. To recover the uplink RF communication signals 30U at the central unit 14 to be provided to the BTS 22, an up converter circuitry (UC) 40 is provided in the central unit 14 to up convert the uplink RF communications signals 24U to the uplink RF communications signals 20U. The uplink RF communication signals 20U are of the same or substantially the same frequency as the uplink RF communications signals 30U in this embodiment. The uplink RF communication signals 20U may be frequency locked to the uplink RF communications signals 30U, such as through employing a frequency locked loop (FLL) circuit in the UC 40. The uplink RF communication signals 20U is phase locked to the uplink RF communications signals 30U, such as through employing a phase locked loop (PLL) circuit in the UC 40.

The communications medium 26 in the distributed antenna system 10 could be any number of mediums. For example, the communications medium may be electrical conductors, such as twisted-pair wiring or coaxial cable. Frequency division multiplexing (FDM) or time division multiplexing (TDM) can be employed to provide RF communications signals between the central unit 14 and multiple RUs 12 communicatively coupled to the central unit 14 over the same communication medium 26. Alternatively, separate, dedicated communications medium 26 may be provided between each RU 12 and the central unit 14. The UCs 36, 40, and DCs 38, 34 in the RUs 12 and the central unit 14 could be provided to frequency shift at different IFs to allow RF communications signals from multiple RUs 12 to be provided over the same communications medium 26 without interference in RF communications signals (e.g., if different codes or channels not employed to separate signals for different users).

Also, for example, the communications medium 26 may have a lower frequency handling rating that the frequency of the RF communication service. In this regard, the down conversion of the downlink and uplink RF communication signals 20D, 30U can frequency shift the signals to an IF that is within the frequency rating of the medium 26. The communications medium 26 may have a lower bandwidth rating than the bandwidth requirements of the RF communications services. Thus, again, the down conversion of the downlink and uplink RF communication signals 20D, 30U can frequency shift the signals to an IF that provides a bandwidth range within the bandwidth range of the medium 26. For example, the distributed antenna system 10 may be configured to be employed using an existing communications medium 26 for other communications services, such as digital data services (e.g., WLAN services). For example, the medium 26 may be CAT 5, CAT 6, or CAT 7 conductor cable that is used for wired services such as Ethernet based LAN as non-limiting examples. In this example, down conversion ensures that the downlink and uplink RF communications signals 24D, 24U can be communicated with acceptable signal attenuation.

With continuing reference to FIG. 1, synthesizer circuits 42, 44 are provided to provide RF reference signals for frequency conversion by the DCs 34, 38 and the UCs 40, 36 in the central unit 14 and the RU 12, respectively. The synthesizer circuitry 42 is provided in the central unit 14. The synthesizer circuitry 44 is provided in the RU 12. The synthesizer circuit 42 in the central unit 14 provides one of more local oscillator (LO) signals 46 to the DC 34 for frequency shifting the downlink RF communications signals 20D to the downlink RF communications signals 24D at a different, intermediate frequency (IF). The synthesizer circuit 42 also provides one of more RF reference signals 48 to the UC 40 for frequency shifting the uplink RF communications signals 24U from the IF to the frequency of the RF communication services to provide the uplink RF communications signals 20U.

As a non-limiting example, the LO signals 46, 48 may be directly provided to mixers in the DC 34 and UC 40 to control generation of mixing RF signals (not shown) to be mixed with the downlink RF communications signals 20D and the uplink RF communications signals 24U, respectively, for frequency shifting. As another non-limiting example, the LO signals 46, 48 may not be provided directly to mixers in the DC 34 and UC 40. The LO signals 46, 48 may be provided to control other circuitry that provides signals to control the mixers in the DC 34 and the UC 40. The oscillators in the DC 34 and the UC 40 generate mixing RF signals to be mixed with the downlink RF communications signals 20D and the uplink RF communications signals 24U, respectively, for frequency shifting.

The synthesizer circuit 44 in the RU 12 provides one or more LO 50 to the DC 38 for frequency shifting the uplink RF communications signals 30U to the uplink RF communications signals 24U at a different, intermediate frequency (IF). The synthesizer circuit 44 also provides one or more LO signals 52 to the UC 36 for frequency shifting the downlink RF communications signals 24D from the IF to the frequency of the RF communications services to provide the uplink RF communication signals 30D. As an example, the LO signals 50, 52 may be directly provided to mixers in the DC 38 and UC 36 to control generation of mixing RF signals (not shown) to be mixed with the downlink RF communications signals 24D and the uplink RF communications signals 30U, respectively, for frequency shifting. As another non-limiting example, the LO signals 50, 52 may not be provided directly to mixers in the DC 38 and UC 36. The LO signals 50, 52 may be provided to control other circuitry that provides signals to control the mixers in the DC 38 and the UC 36. The oscillators in the synthesizer circuit 44 and the UC 36 generate mixing RF signals to be mixed with the downlink RF communications signals 24D and the uplink RF communications signals 30U, respectively, for frequency shifting.

As will be discussed in more detail below, the distributed antenna system 10 in FIG. 1 includes one or more RFIC chips for providing the distributed antenna system functionalities, including those functionalities discussed above. A RFIC chip is a specially designed integrated circuit that includes desired groupings of circuits or components described herein for realizing specific functionalities. By providing RFIC chips, part count and/or board area (or density) for circuits or components described herein may be reduced. As a non-limiting example, a RFIC chip may enable all electronic circuits for the central unit 14 or a RU 12 to be provided with less than seventy percent (70%) of cost, fifteen integrated circuits, and/or four hundred (400) passive components, as compared to designs that do not employ RFIC chips. As another example, RFIC chips can enable electronic circuits to be provided in a square area of less than 100 cm$^2$.

Providing distributed antenna system 10 functionalities in RFIC chips can allow integration of multiple electronic circuits that provide multiple functionalities in a single RFIC chip or reduced RFIC chip set. Cost reductions, size reduction, increased performance, increased reliability, and improved manufacturability in electronic circuits are non-limiting examples of advantages that may be realized through use of RFICs in the distributed antenna system 10 components.

With continuing reference to the distributed antenna system 10 in FIG. 1, the radio interface 18 in the central unit 14 contains radio interface circuitry that can be included in a radio interface RFIC chip 54. The UC 40 in the central unit 14 contains up conversion circuitry that can be included in an up conversion RFIC chip 56. The DC 34 in the central unit 14 contains down conversion circuitry that can be included in a down conversion RFIC chip 58. The synthesizer circuitry 42 in the central unit 14 can be included in a synthesizer RFIC chip 60. The communications interface 27 in the central unit 14 contains communications interface circuitry that can be included in a communications interface RFIC chip 62. Alternatively, the radio interface 18, the UC 40, the DC 40, the synthesizer circuitry 42, and the communications interface 27, or any combination or subset thereof, could be included in a single central unit RFIC chip 64.

With continuing reference to FIG. 1, the antenna interface 32 in the RU 12 contains antenna interface circuitry that can be included in an antenna interface RFIC chip 66. The DC 38 in the RU 12 contains down conversion circuitry that can be included in a down conversion RFIC chip 68. The UC 36 in the RU 12 contains up conversion circuitry that can be included in an up conversion RFIC chip 70. The synthesizer circuitry 44 in the RU 12 can be included in a synthesizer RFIC chip 72. The communications interface 28 in the RU 12 contains communications interface circuitry that can be included in a communications interface RFIC chip 74. Alternatively, the antenna interface 32, the UC 36, the DC 38, the synthesizer circuitry 44, and the communications interface 28, or any combination or subset of the foregoing, could be included in a single RU RFIC chip 76.

The central unit 14 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, and WLAN frequencies. The central unit 14 may support frequency division duplexing (FDD) and time divisional duplexing (TDD).

In another embodiment, an exemplary RU 12 may be configured to support up to four (4) different radio bands/carriers (e.g. ATT, VZW, T-Mobile, Metro PCS: 700LTE/850/1900/2100). Radio band upgrades can be supported by adding remote expansion units over the same communications media (or upgrade to MIMO on any single band). The RUs 12 and/or remote expansion units may be configured to provide external filter interface to mitigate potential strong interference at 700 MHz band (Public Safety, CH51,56); Single Antenna Port (N-type) provides DL output power per band (Low bands (<1 GHz): 14 dBm, High bands (>1 GHz): 15 dBm); and satisfies the UL System RF spec (UL Noise Figure: 12 dB, UL IIP3: −5 dBm, UL AGC: 25 dB range).

It may be desirable to provide both digital data services and RF communications services for wireless client devices in a distributed antenna system that employs an automatic antenna selection arrangement. Examples of digital data services include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10 G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 2:
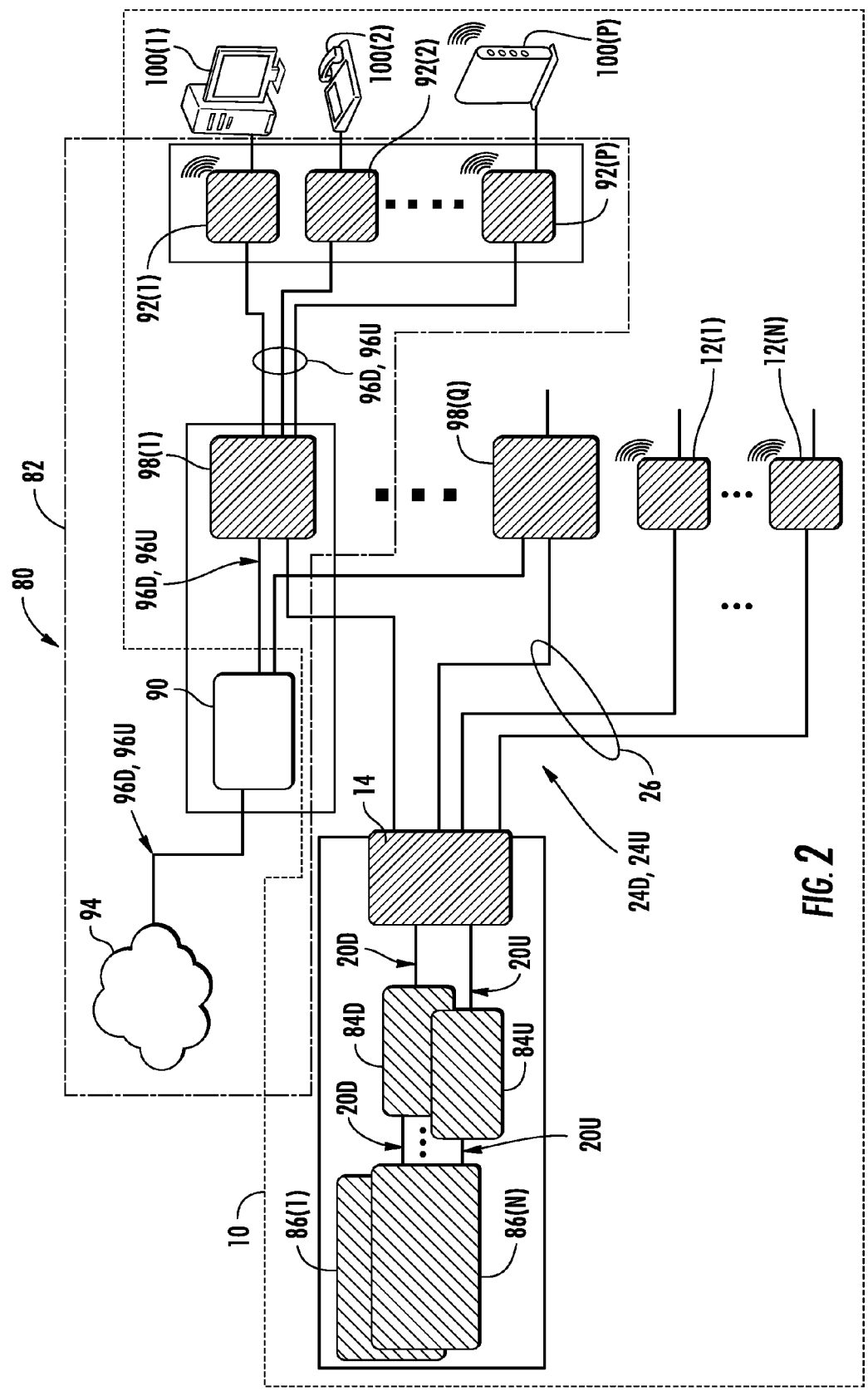
FIG. 2 is a schematic diagram of an exemplary distributed antenna system that includes the distributed RF communications system in FIG. 1 and a distributed wireless local access network (WLAN) system for providing digital data services to WLAN access points (APs), wherein the distributed WLAN and RF communications systems share a distribution communications media.

In this regard, FIG. 2 is a schematic diagram of an exemplary distributed antenna system 80 that includes the distributed RF communications system 10 in FIG. 1 and a wireless local access network (WLAN) system 82 for providing digital data services. The distributed antenna system 10 includes the central unit 14 described above with regard to FIG. 1. The central unit 14 is configured to receive the downlink electrical communications signals 20D through downlink interfaces 84D from one or more base stations 86(1)-86(N), wherein N can be any number. The central unit 14 can be configured receive RF communications services from multiple base stations 86(1)-86(N) to support multiple RF radio bands in the system 10. The central unit 14 is also configured to provide the downlink RF communication signals 24D to the RUs 12(1)-12(N) and receive the uplink RF communications signals 24U from RUs 12(1)-12(N) over the communications medium 26. M number of RUs 12 signifies that any number, M number, of RUs 12 can be communicatively coupled to the central unit 14.

With continuing reference to FIG. 2, a digital data switch 90 may also be provided in the WLAN system 82 for providing digital data signals, such as for WLAN services for example, to RUs 92(1)-92(P) configured to support digital data services, wherein P signifies that any number of the RUs 92 may be provided and supported by the WLAN system 82. The digital data switch 90 may be coupled to a network 94, such as the Internet. Downlink digital data signals 96D from the network 94 can be provided to the digital data switch 90. The downlink digital data signals 96D can be then provided to the RUs 92(1)-92(P) through slave central units 98(1)-98(Q), wherein Q can be any number desired. The digital data switch 90 can also receive uplink digital data signals 96U from the RUs 92(1)-92(P) to be provided back to the network 94. The slave central units 98(1)-98(Q) also receive the downlink RF communications signals 24D and provide uplink RF communications signals 24U from the RUs 92(1)-92(P) to the central unit 14 in this embodiment. In this regard, the RUs 92(1)-92(P), by being communicatively coupled to a slave central unit 98(1) that supports both the RF communications services and the digital data services, is included in both the distributed antenna system 10 and the WLAN system 82 to support RF communication services and digital data services, respectively, with client devices 100(1)-100(P). For example, such RU 92 may be configured to communicate wirelessly with the WLAN user equipment (e.g., a laptop) and Wide Area Wireless service user equipment (e.g., a cellular phone).

Figure 3:
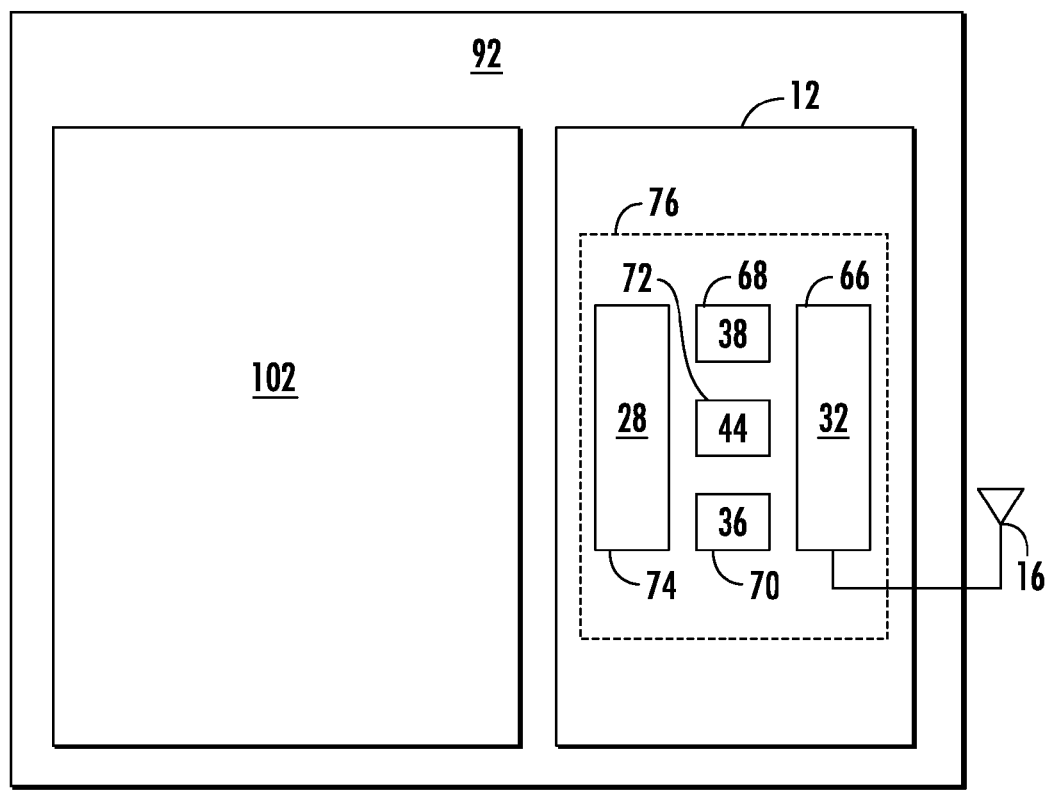
FIG. 3 is a schematic diagram of an RU that can be included in the system in FIG. 2, wherein the RU includes combined functionality of an AP and a RF antenna unit to support digital data services and RF communications services.

FIG. 3 is a schematic diagram of the RU 92 in FIG. 2 that can support both RF communications services and digital data services. As illustrated in FIG. 3, the RU 92 includes a digital data services AP 102 (hereinafter "AP 102"), which may be an AP, and the RU 12 previously described in regard to FIG. 1. In this manner, the RU 92 includes the circuitry to support both digital data services via the AP 102 and RF communication services via the RU 12. For example, the AP 102 may be a WLAN digital data service module or board. The AP 102 may be an AP that is commonly available. By providing the RFIC chip(s) in the RU 12, the RU 12 can be provided in a reduced size and form factor that may allow the RU 12 to be provided in an existing form factor of the AP 102 and in a cost effective manner.

Figure 4:
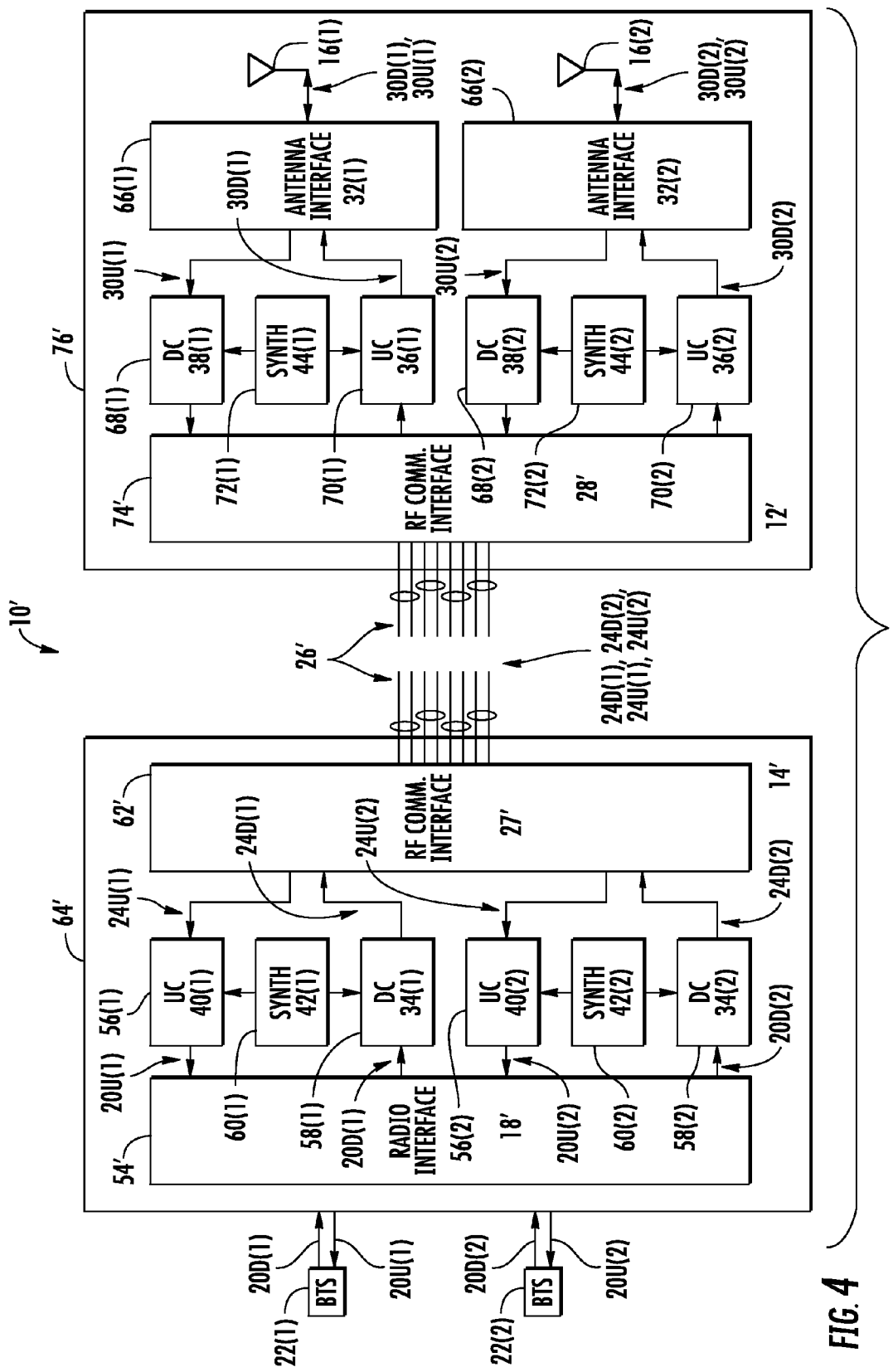
FIG. 4 is a schematic diagram of a dual radio band distributed RF communications system employing RFIC chips for providing RF communications services to RUs.

FIG. 4 is a schematic diagram of an exemplary dual radio band distributed RF antenna system 10' employing RF integrated circuit (RFIC) chips for providing RF communications services to RUs 12'. The distributed antenna system 10' employs a central unit 14' communicatively coupled to one or more RUs 12' that can provide multiple radio bands. Only two radio bands are illustrated in FIG. 4 as being provided in the distributed antenna system 10', however, the system 10' and its components could be configured to provide any number of radio bands, as desired. Common element numbers between components in the distributed antenna system 10' in FIG. 4 and the distributed antenna system 10 in FIG. 1 denote common elements and functionality, and thus will not be re-described. The notations (1) and (2) signify common elements, but two of the elements provided, each for supporting a radio band among the two supported radio bands. Other combinations of radio bands may also be created using the RFIC chip(s) (e.g., triple band, quadro band etc.).

With continuing reference to FIG. 4, because the distributed antenna system 10' in FIG. 4 is shown as supporting two radio bands, the central unit 14' is configured to receive downlink RF communications signals 20D(1), 20D(2) from two BTSs 22(1), 22(2) and receive uplink RF communications signals 24U(1), 24U(2) from the RU 12'. The radio interface 18' is configured to provide the downlink RF communications signals 20D(1), 20D(2) to two dedicated circuitries, one for each radio band. UC 40(1), synthesizer circuitry 42(1), and DC 34(1) are provided to support the first radio band. UC 40(2), synthesizer circuitry 42(2), and DC 34(2) are provided to support the second radio band. Similarly, the RU 12' is configured to receive downlink RF communications signals 24D(1), 24D(2) from the central unit 14', and receive uplink RF communications signals 30U(1), 30U(2) for distribution to the central unit 14'. The communications interface 28' is configured to provide the downlink RF communications signals 24D(1), 24D(2) to two dedicated circuitries, one for each radio band. UC 36(1), synthesizer circuitry 44(1), and DC 38(1) are provided to support the first radio band. UC 36(2), synthesizer circuitry 44(2), and DC 38(2) are provided to support the second radio band.

With continuing reference to FIG. 4, first and second antennas 16(1), 16(2) are coupled to antenna interfaces 32(1), 32(2) to support the two radio bands. The first and second antennas 16(1), 16(2) could be provided as antenna elements as part of a single antenna that has dual radio band capability of the RU 12'. Alternatively, the first and second antennas 16(1), 16(2) could be provided as separate antennas to provide the dual radio band capability of the RU 12'.

Just as provided in the distributed antenna system 10 in FIG. 1, the circuitry of the distributed antenna system 10' can be included in a RFIC chips. As one example, the same RFIC chips illustrated in the distributed antenna system 10 in FIG. 1 can be provided in the distributed antenna system 10' in FIG. 4. Two RFIC chips are provided in the distributed antenna system 10' in FIG. 4 for each RFIC chip in the distributed antenna system 10 in FIG. 1, with the notations (1) and (2) to signify RFIC chips supporting circuitry for the first radio band or the second radio band, respectively.

Also note that although in this example in FIG. 4, the DCs 34 is provided in the downlink communications path to downconvert the downlink RF communications signals and the UCs 40 are provided in the uplink communications path to upconvert the uplink RF communications signals, the opposite configuration could be provided. That is, the UCs 40 could be provided in the downlink communications path to upconvert the downlink RF communication signals, and the DCs 34 be provided in the uplink communications path to downconvert the uplink RF communications signals. These frequency conversion circuitries can be also referred to generally as first, second, third, etc. frequency conversion circuitries.

Figure 5:
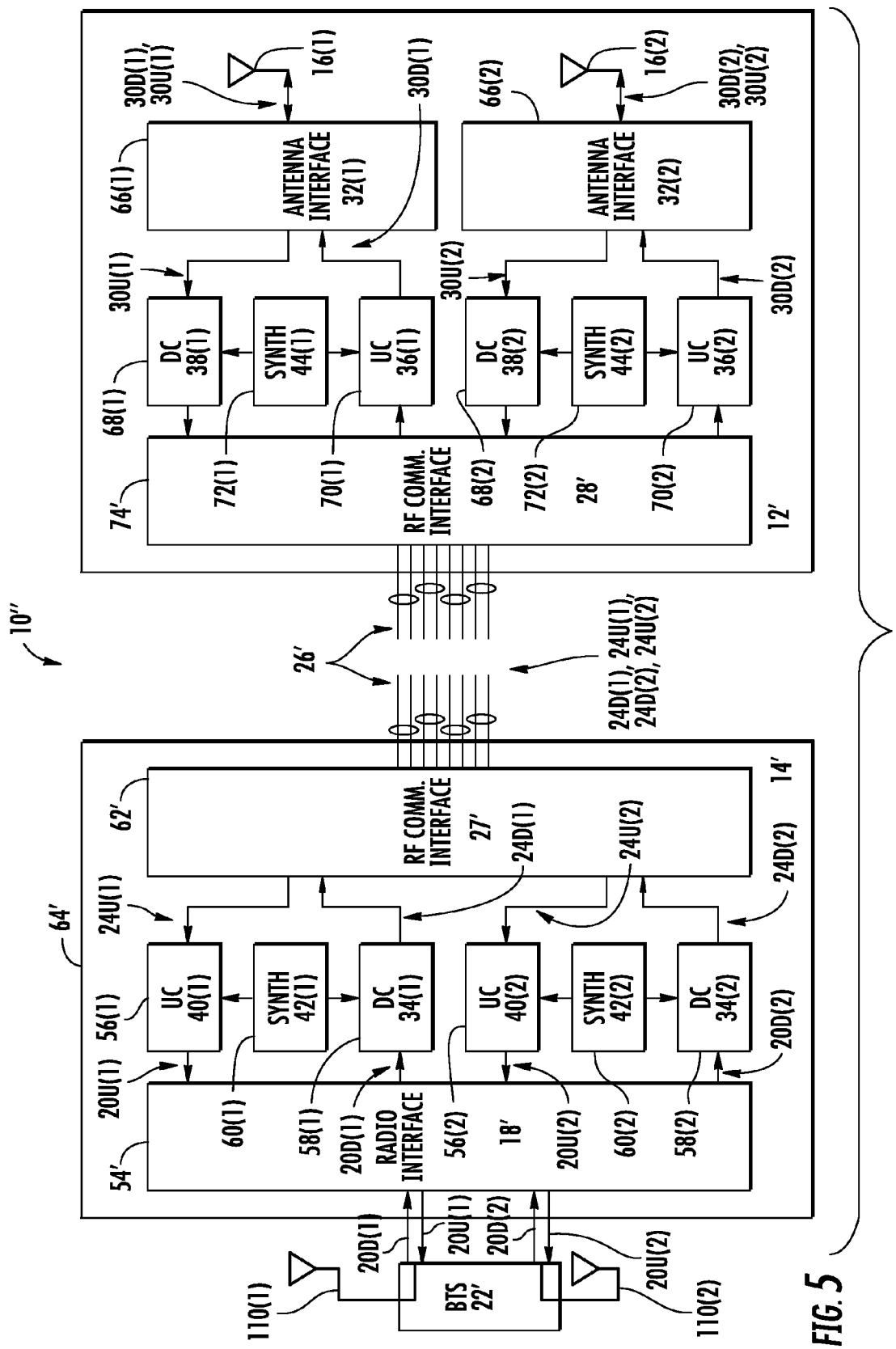
FIG. 5 is a schematic diagram of a single band multiple-input/multiple-output (MIMO) distributed RF communications system employing RFIC chips.

FIG. 5 is a schematic diagram of an exemplary single band, multiple-input/multiple-output (MIMO) distributed RF communications system 10" employing RFIC chips for providing RF communications services to the RUs 12'. The distributed antenna system 10" includes common elements, signified by common element numbers, with the distributed antenna system 10' in FIG. 4, and thus will not be re-described. The two antennas 16(1), 16(2) in the RU 12' are configured to provide downlink RF communications signals 30D(1), 30D(2) and receive uplink RF communications signals 30U(1), 30U(2) of the same RF frequency to support MIMO RF communications services. The notations (1) and (2) in this example signify 2×2 MIMO RF communications signal paths, but other higher MIMO communications schemes (e.g., 4×4) can also be provided with appropriate scaling.

The communications medium 26' is configured to either provide separate communications paths for the downlink RF communications signals 24U(1), 24U(2) providing multiple downlink communications paths, and the uplink RF communications signals 24U(1), 24U(2) providing multiple uplink communications paths. Alternatively, common paths in the communications medium 26' could be employed for downlink RF communications signals 24U(1), 24U(2) and the uplink RF communications signals 24U(1), 24U(2). DCs 34(1), 34(2) could be configured to frequency shift the downlink RF communication signals 24D(1), 24D(2) to different IFs to avoid interference between the multiple downlink communications paths. Similarly, the DCs 38(1), 38(2) could be configured to frequency shift the uplink RF communication signals 30D(1), 30D(2) to different IFs to avoid interference between the multiple uplink communications paths.

Figure 6:
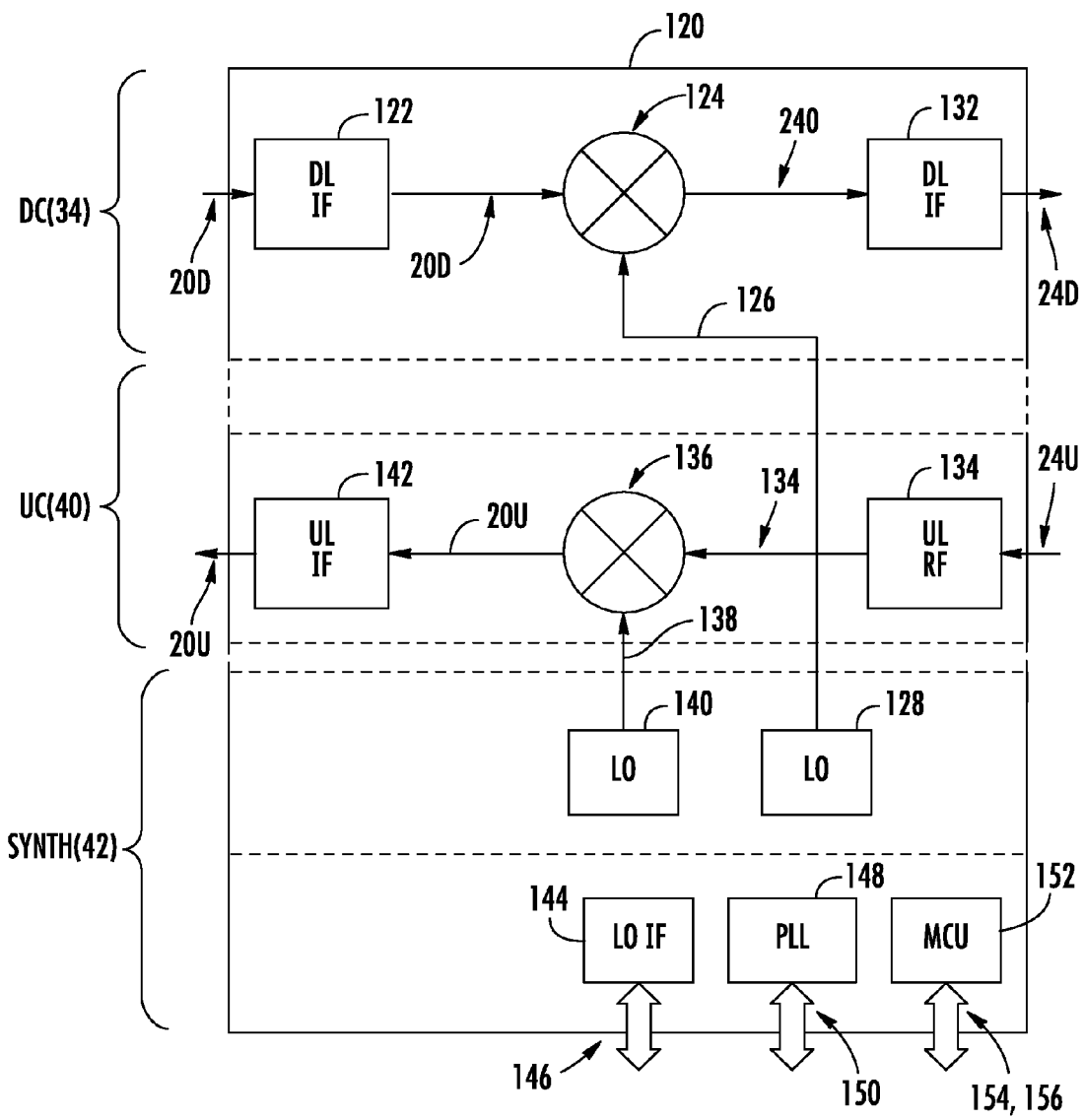
FIGS. 6-8 are schematic diagrams of exemplary RFIC architectures that can be provided in a central unit supporting RF communications services to RUs.

The DC 34, UC 40, and synthesizer circuitry 42 in the central unit 14 in FIGS. 4 and 5 can be provided in differing configurations and organizations in one or more RFIC chips. For example, FIG. 6 is a schematic diagram of exemplary RFIC chip architectures that can be provided in the central unit 14 for supporting RF communications to RUs 12 in a distributed antenna system, including the distributed antenna system described above. With reference to FIG. 6, in one example, the DC 34, UC 40, and synthesizer circuitry 42 can be provided in a single RFIC chip 120. In this regard, the DC 34 is comprised of a downlink interface (DL IF) 122 that receives the downlink electrical communication signals 20D. The DL IF 122 provides the downlink electrical communication signals 20D to a downconversion mixer 124. The downconversion mixer 124 also receives a local oscillator signal 126 from a local oscillator 128 in the synthesizer circuitry 42. The local oscillator signal 126 serves as a reference to the downconversion mixer 124 for downconverting the frequency of the downlink electrical RF communications signals 20D to downlink electrical RF signals 130D at a different intermediate frequency than the frequency of the downlink electrical RF communication signals 20D. The downlink electrical RF communication signals 24D are provided to a downlink RF circuit 132 to provide the downlink RF signals 24D to the RF communications interface 62 as shown in FIGS. 4 and 5.

With continuing reference to FIG. 6, the uplink RF communications signals 24U are received by an uplink RF circuit 134 in the RFIC chip 120. The uplink RF communications signals 24U are provided from the uplink RF circuit 134 to an upconversion mixer 136 to be combined with a local oscillator signal 138 from a local oscillator 140. The local oscillator signal 138 is provided such that its frequency is mixed with the downlink RF communications signals 24U to upconvert the frequency from an intermediate frequency to the RF frequency to be provided as the uplink electrical RF communications signals 20U. The uplink electrical RF communications signals 20U are provided to an uplink interface 142 which then provides the uplink electrical RF communications signals 20U to the radio interface 54.

With continuing reference to FIG. 6, the synthesizer circuit, in addition to containing the local oscillators 128, 140 also include several other exemplary components. For example, the synthesizer circuitry 42 contains a local oscillator interface circuit 144 that is configured for generating and decoding management signals 146. For example these management signals 146 may be amplitude shift key (ASK) management signals. The management signals 146 may be provided to control the local oscillators 128, 140 including when the local oscillators 128, 140 are activated and deactivated. The management signals 146 may also contain other information unrelated to the local oscillators 128, 140 for providing other information to the central unit 14 and/or its components. The synthesizer circuitry 42 in FIG. 6 also contains a phase lock loop (PLL) circuit 148 that is configured to measure the frequency ratio between a local lock source signal 150 and the management signal 146 and update the local oscillators 128, 140 to provide accurate frequency and clean local oscillator signals 126, 138. The synthesizer circuitry 42 may also contain a micro-controller unit 152 that is configured to receive controller signals 154 and to provide controller output signals 156 for reporting, monitoring, and or controlling the components in the RFIC chip 120 as desired.

Note that although the DC 34, the UC 40, the synthesizer circuitry 42 are provided in the same RFIC chip 120 in FIG. 6, other organizations with regard to RFIC chip partitioning are possible. For example, the DC 34, the UC 40, and the synthesizer circuitry 42 could be provided in separate RF chips as shown by the dashed lines in FIG. 6. As another example, the DC 34 and the UC 40 could be provided in one RFIC chip and the synthesizer circuitry 42 provided in a separate RFIC chip. In that configuration, the local oscillators 128, 140 may be included in the same RFIC chip that includes the DC 34 and UC 40. Alternatively, the local oscillator 128 and local oscillator 140 may be included in the same RFIC chip that includes the local oscillator interface 144, the PLL circuit 148, and the micro-controller unit 152.

Figure 7:
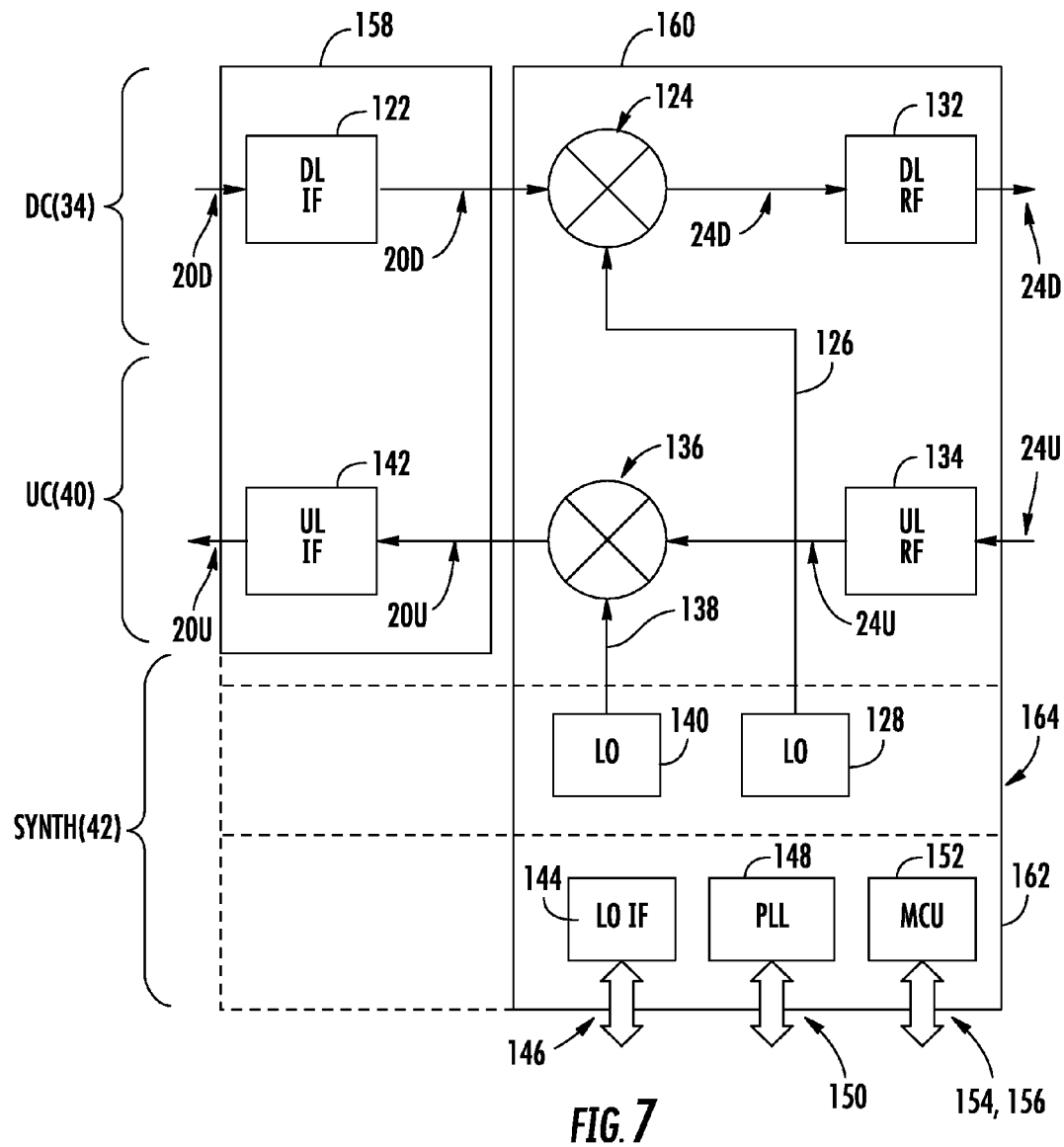
Figure 8:
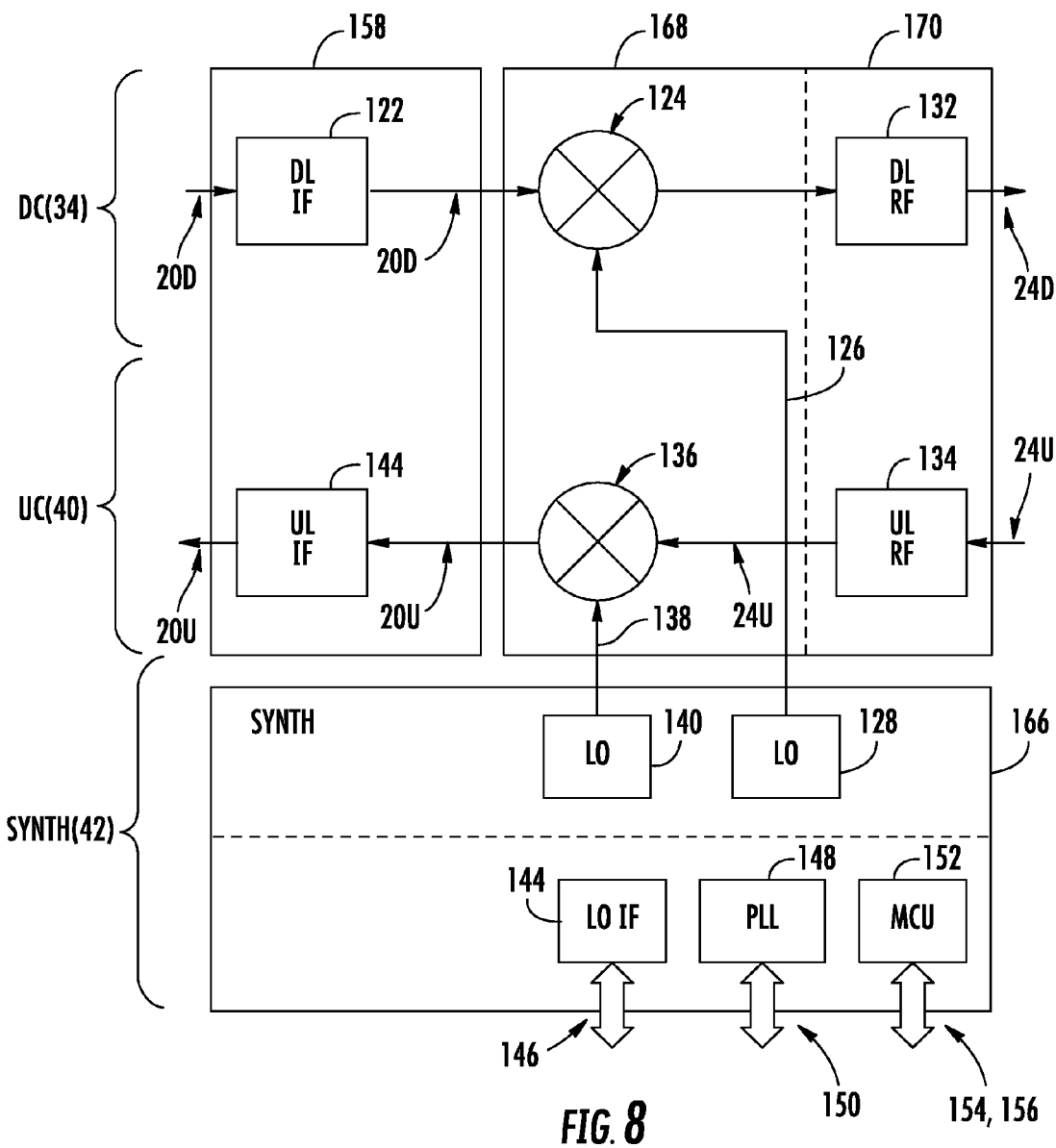

Other architectures of dividing the DL 34, the UC 40, and the synthesizer circuitry 42 components into more than one RFIC chip are also possible. For example, FIG. 7 illustrates these components with alternative configurations of splitting these components between different RFIC chips. For example, the downlink interface 122 and the uplink interface 142 may be provided together in a RFIC chip 158. The other components as illustrated in FIG. 7 may be provided in another RFIC chip 160. Alternatively, the local oscillators 128, 140 could be included in the same RFIC chip as the downconversion and upconversion mixers 124, 136, and the downlink RF circuit 132 and the uplink RF circuit 134. The local oscillator interface 144, the PLL circuit 148, and the micro-controller unit 152 could be provided in a third RFIC chip 162. In yet another configuration, the local oscillators 128, 140 could be included in the same RFIC chip 162 and not in the RFIC chip 160. In yet another configuration, four RFIC chips could be provided. RFIC chip 158 is illustrated in FIG. 7 could be provided the local oscillators 128, 140 could be provided in a fourth RFIC chip 164, wherein the local oscillator interface 144, the PLL circuit 148, and the micro-controller unit 152 are provided in a third RFIC chip 162. The RFIC chip 160 could include the downconversion and upconversion mixers 124, 136, the downlink RF circuit 132, and the uplink RF circuit 134. In yet another configuration, the downlink interface 122, the uplink interface 142, and the local oscillators 128, 140 could be provided in a single RFIC chip. The local oscillator interface 144, the PLL circuit 148, and the micro-controller unit 152 would be included in a second RFIC chip, and the downconversion and upconversion mixers 124, 136, the downlink RF circuit 132 and the uplink RF circuit 134 included in a third RFIC chip. FIG. 8 illustrates additional configurations of providing the components of the DC 34, the UC 40, and the synthesizer circuitry 42 into different RFIC chips. For example, as illustrated in FIG. 8, the downlink interface 122 and uplink interface 142 could be included in the RFIC chip 158. The local oscillators 128, 140, and the local oscillator interface 144, the PLL circuit 148, and the micro-controller unit 152 could be included in a second RFIC chip 166. The downconversion mixer 124 and the upconversion mixer 136 could be included in a third RFIC chip 168. The downlink RF circuit 132 and the uplink RF circuit 134 could be included in the RFIC chip 168 or could be included in their own fourth RFIC chip 170.

Figure 9:
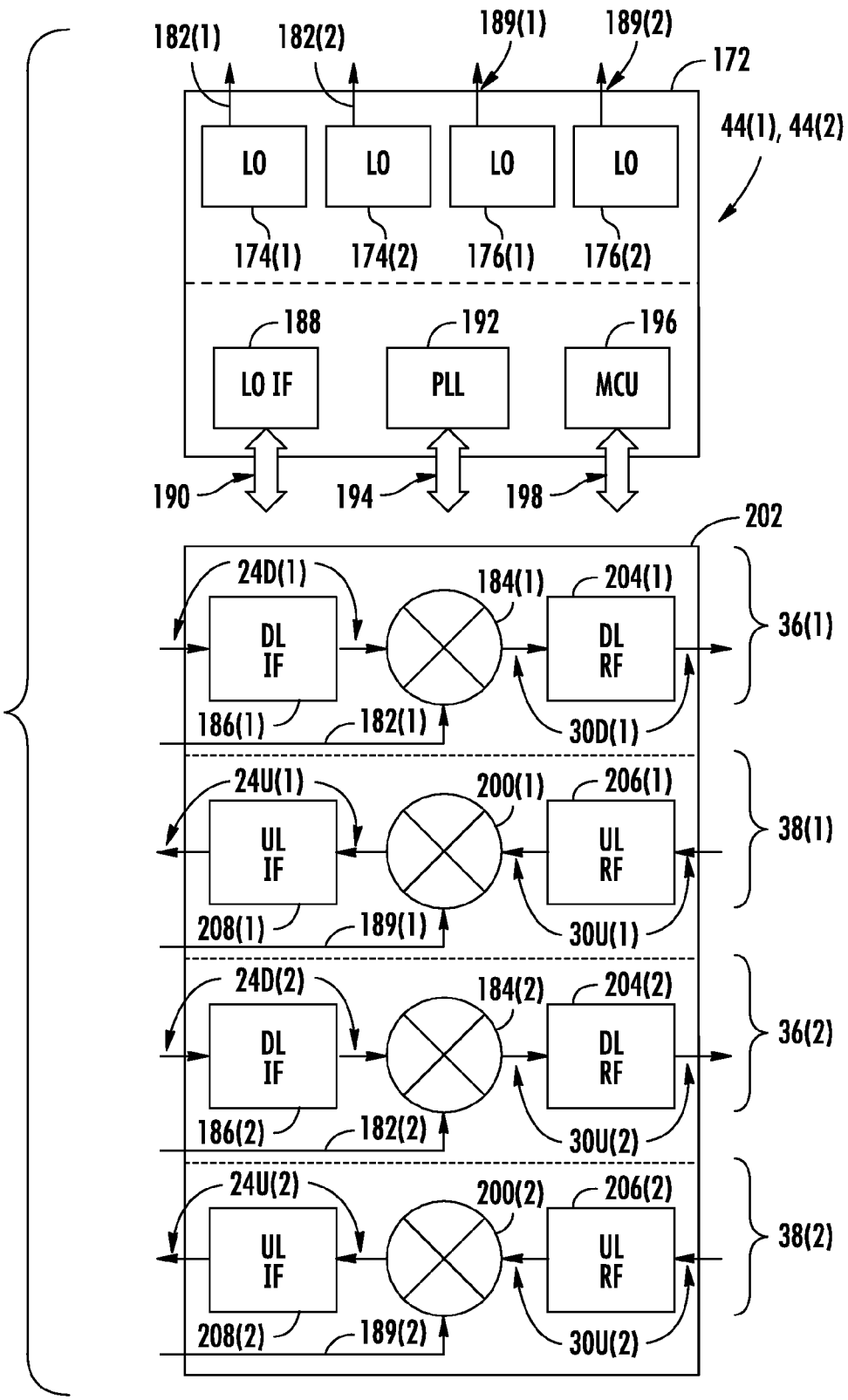
FIGS. 9-14 are schematic diagrams of exemplary RFIC chip architectures that can be provided in a RU supporting RF communications services in a distributed antenna system.

The components provided in the remote units 12 can also be organized in different configurations and provided among one or more RFIC chips. FIG. 9 illustrates one embodiment of UC 36, DC 38, and synthesizer circuitry 44 organized among one or more RFIC chips. In the example of FIG. 9, the synthesizer circuitry 44(1), 44(2) is provided in a single RFIC chip 172. In this embodiment, the synthesizer circuitry 44(1), 44(2) supports two different radio bands for a RU 12. In this regard, the synthesizer circuitry 44(1), 44(2) includes two upconversion local oscillators 174(1), 174(2) and two downconversion local oscillators 176(1), 176(2). The upconversion local oscillators 174(1), 174(2) provide local oscillation signals 182(1), 182(2) to upconversion mixer 186 and upconversion mixer 188, respectively. The upconvert local oscillator signals 182(1), 182(2) are provided to upconversion mixers 184(1), 184(2) to provide a reference signal for frequency upconversion of downlink electrical RF communications signals 24D(1), 24D(2). The downlink electrical RF communications signals 24D(1), 24D(2) are received by a downlink interfaces 186(1), 186(2) for the RU 12 to support two radio bands. The RFIC chip 172 also contains a local oscillator interface 188 configured to receive source signal 190 for providing control signals to the upconversion local oscillators and downconversion local oscillators 174 (1)-174(2), 176(1)-176(2). A PLL circuit 192 is also provided that is configured to receive control signal 194 to phase lock loop the local oscillators 174(1)-174(2), 176(1)-176(2) to source signal 190. A microcontrol unit 196 is also provided that is configured to exchange management signals 198 for providing control of the synthesizer circuitry 44(1), 44(2).

With continuing reference to FIG. 9, the downconversion local oscillators 176(1), 176(2) are configured to generate downconversion oscillation signals 189(1), 189(2) to be provided to downconversion mixers 200(1), 200(2), respectively. The UCs 36(1), 36(2) and the DCs 38(1), 38(2) are provided in a second RFIC chip 202. For the UCs 36(1), 36(2), the downlink electrical RF communications signals 24D(1), 24D(2) are mixed by the upconversion mixers 184(1), 184(2) to be unconverted back to RF communications signals at the same frequency as the downlink electrical RF communications signals 20D(1), 20D(2) to provide the downlink RF communications signals 30D(1), 30D(2). The downlink RF communications signals 30D(1), 30D(2) are received by downlink RF circuits. The downlink RF circuits 204(1), 204(2) receive the downlink RF communications signals 30D(1), 30D(2) and provide these signals to the antenna interface 32 (see FIGS. 4 and 5).

With continuing reference to FIG. 9, the DCs 38(1), 38(2) are also provided in the RF communication chip 202 containing the UCs 36(1), 36(2). Uplink RF circuits 206(1), 206(2) are provided to receive the uplink RF communication signals 30U(1), 30U(2) from the antenna interface 32. The uplink RF circuits 206(1), 206(2) provide the uplink RF communications signals 30U(1), 30U(2) to the downconversion mixers 200(1), 200(2) to downconvert the frequency of these signals before being provided to the uplink interfaces 208(1), 208(2).

Figure 10:
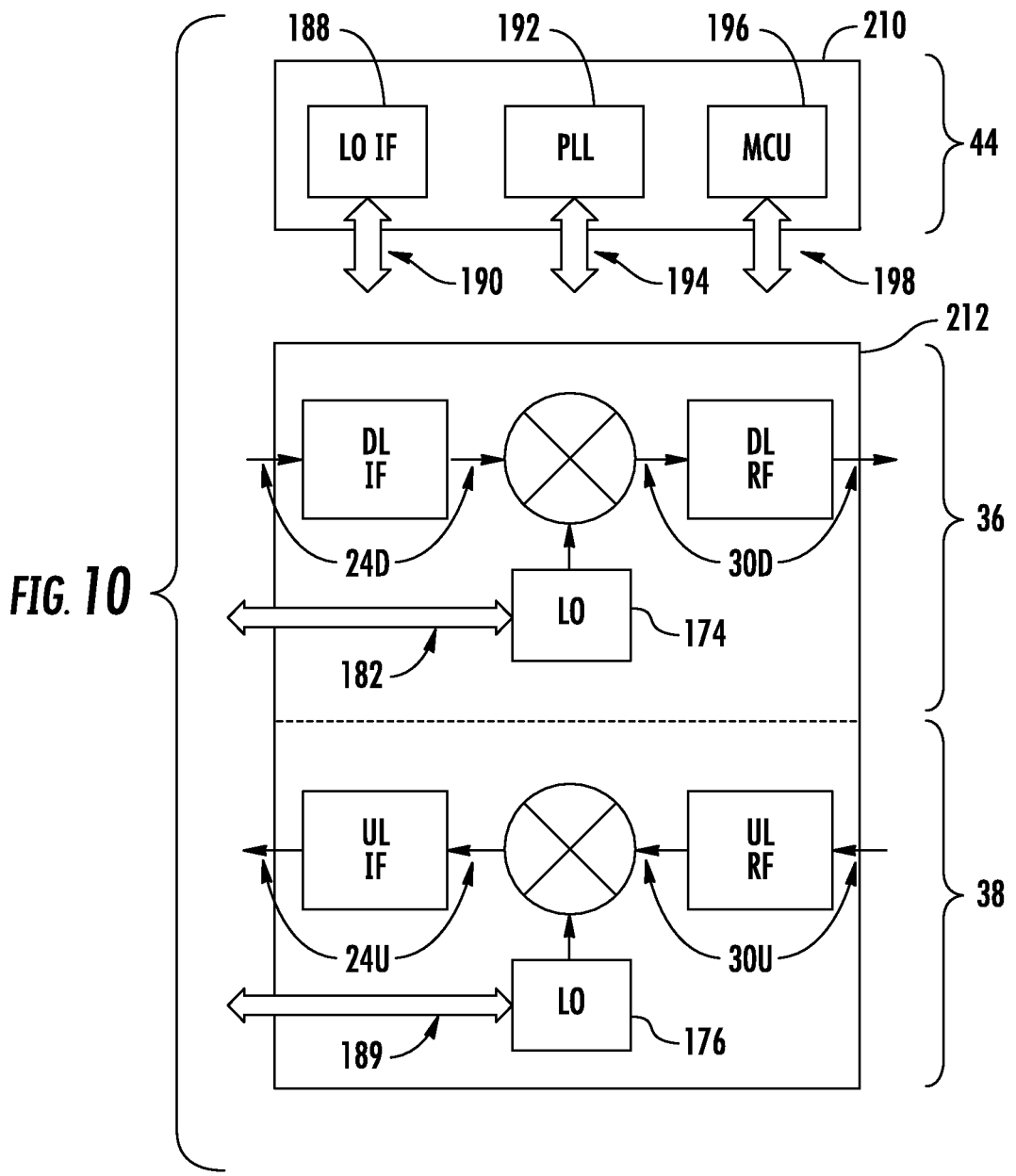

Other configurations and organizations of the UC 36, DC 38, and synthesizer circuitry 44 in the RU 12 can be provided. For example, with reference back to FIG. 9, the local oscillators 174(1), 174(2), 176(1), 176(2) can be provided in a different RFIC chip than the local oscillator interface 188, PLL circuit 192, and micro-controller unit 196. As another example with reference to FIG. 10, a single radio band configuration is shown for the UC 36 and DC 38. Instead of the local oscillators 174, 176 being included in the same RFIC chip 210 as including the local oscillator interface 188, PLL circuit 192, and micro-controller unit 196, the local oscillators 174, 176 are included in a RFIC chip 212 that includes the UC 36 and the DC 38.

Figure 11:
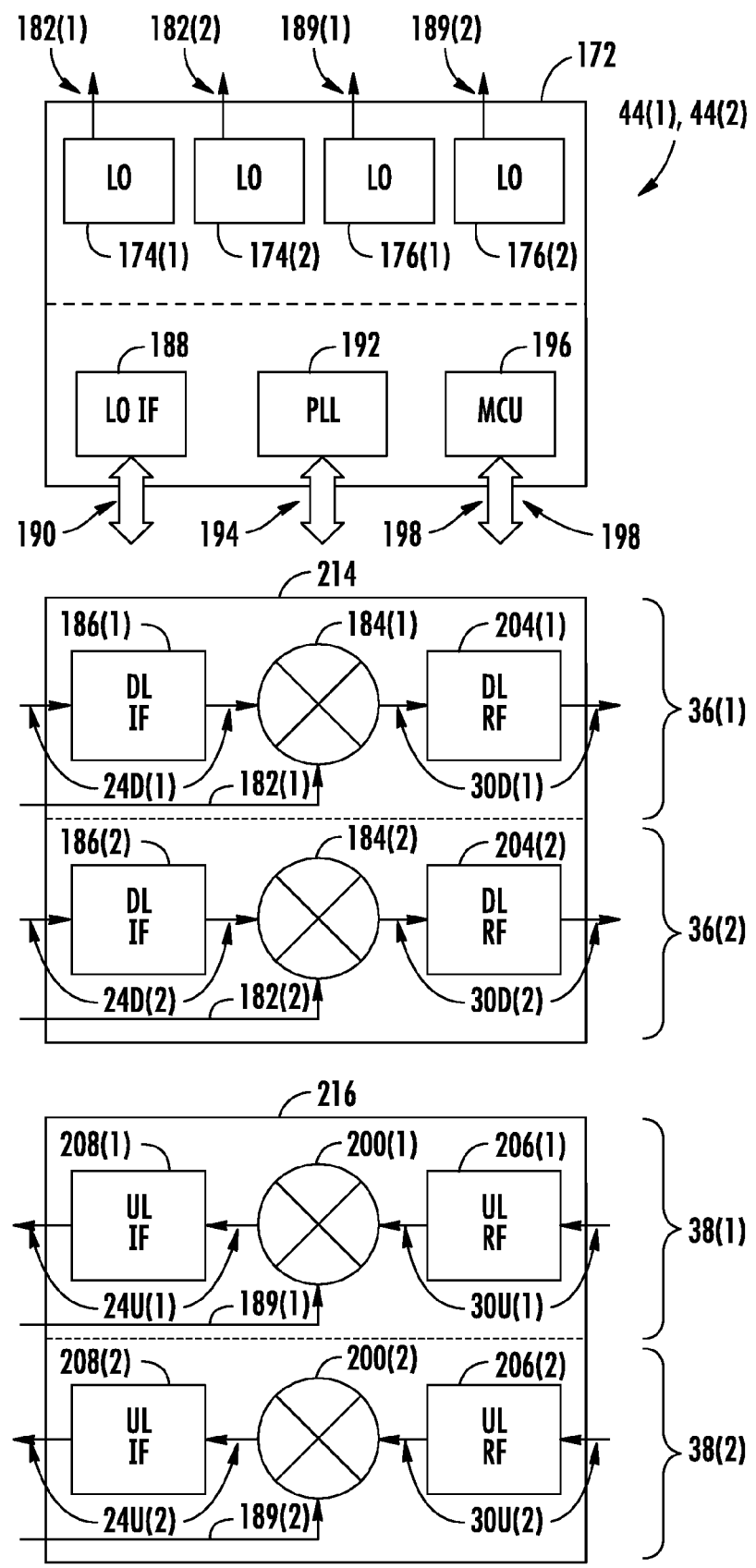

In FIG. 11, an alternative configuration is provided for the UCs 36(1), 36(2) and the DCs 38(1), 38(2). In this embodiment, the UCs 36(1), 36(2) are provided in a separate RFIC chip 214, and the DCs 38(1), 38(2) are provided in a separate RFIC chip 216. The synthesizer circuitry 44(1), 44(2) supporting both radio bands supporting providing both oscillation signals 182(1), 182(2), 189(1), 189(2) are provided in the RFIC chip 172 just as provided in the example of the RU in FIG. 9.

Figure 12:
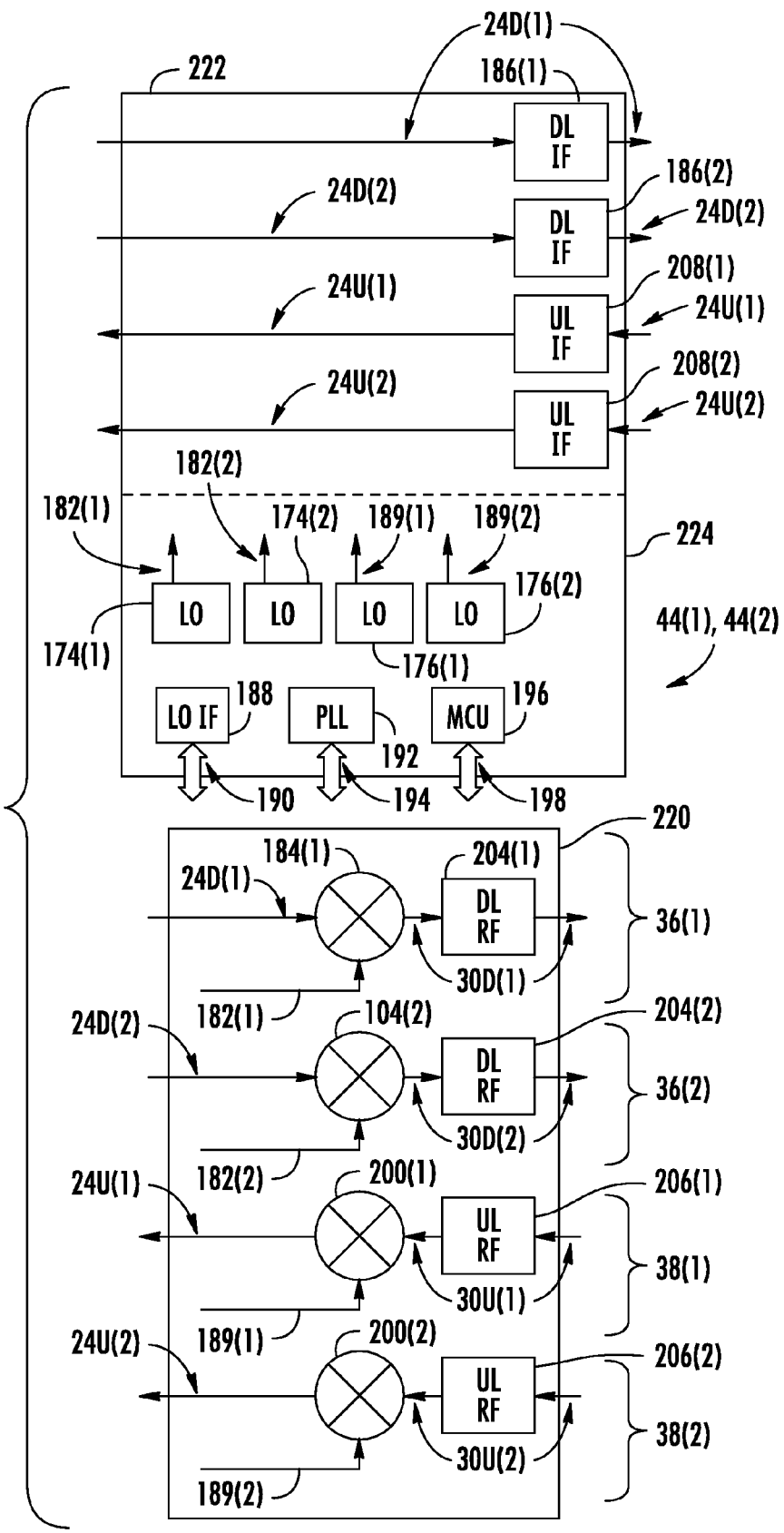

FIG. 12 illustrates yet another variation of organization of the UC 36, DC 38, and synthesizer circuitry 44 among different RFIC chips. In this regard, the UC 36(1), 36(2) and the DC 38(1), 38(2) with the downlink and uplink interfaces 186(1), 186(2), 208(1), 208(2) not included are provided in a first RFIC chip 220. A second RFIC chip 222 contains the synthesizer circuitry 44(1), 44(2) and the downlink and uplink interfaces 186(1), 186(2), 208(1), 208(2). Alternatively, the synthesizer circuitry 44(1), 44(2) could be provided in a third RFIC chip 224 that is separate from the RFIC chip 222, if desired.

Figure 13:
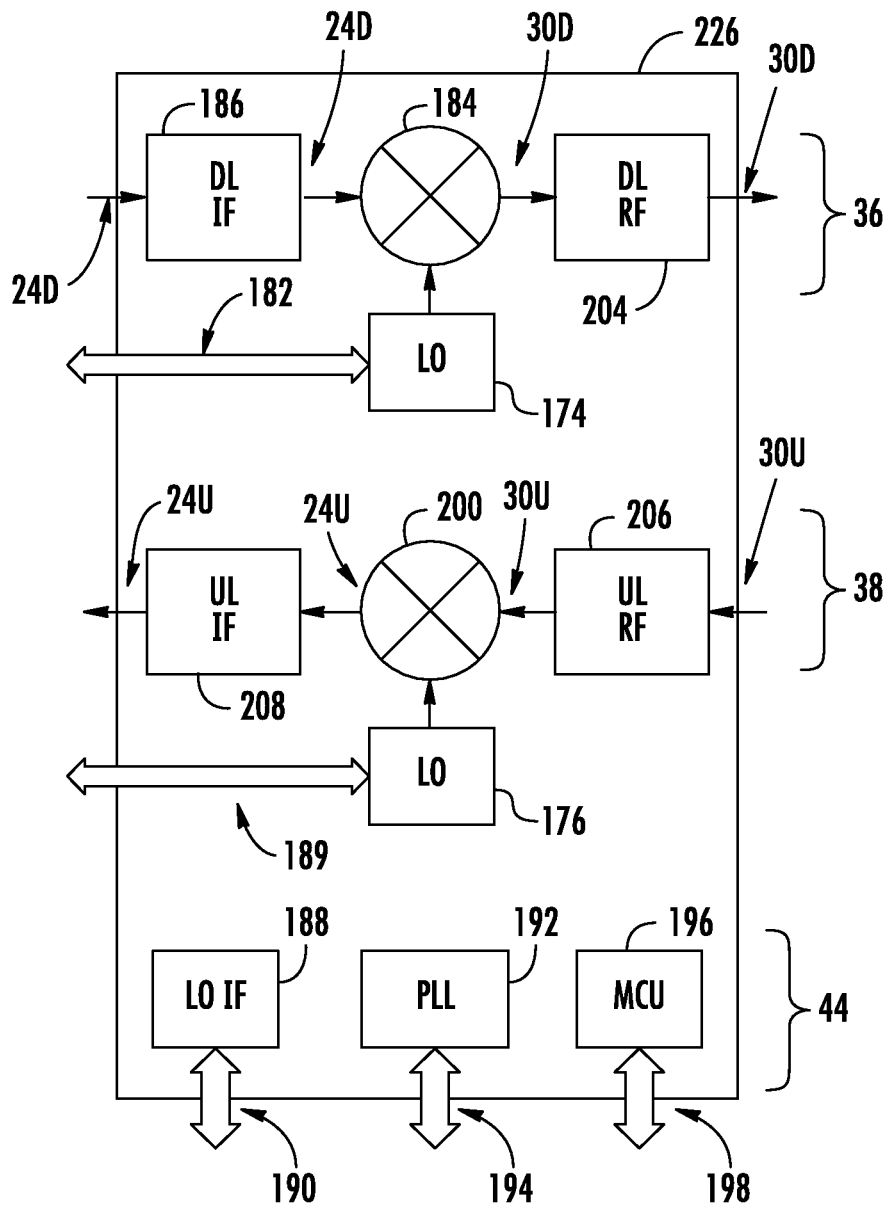
Figure 14:
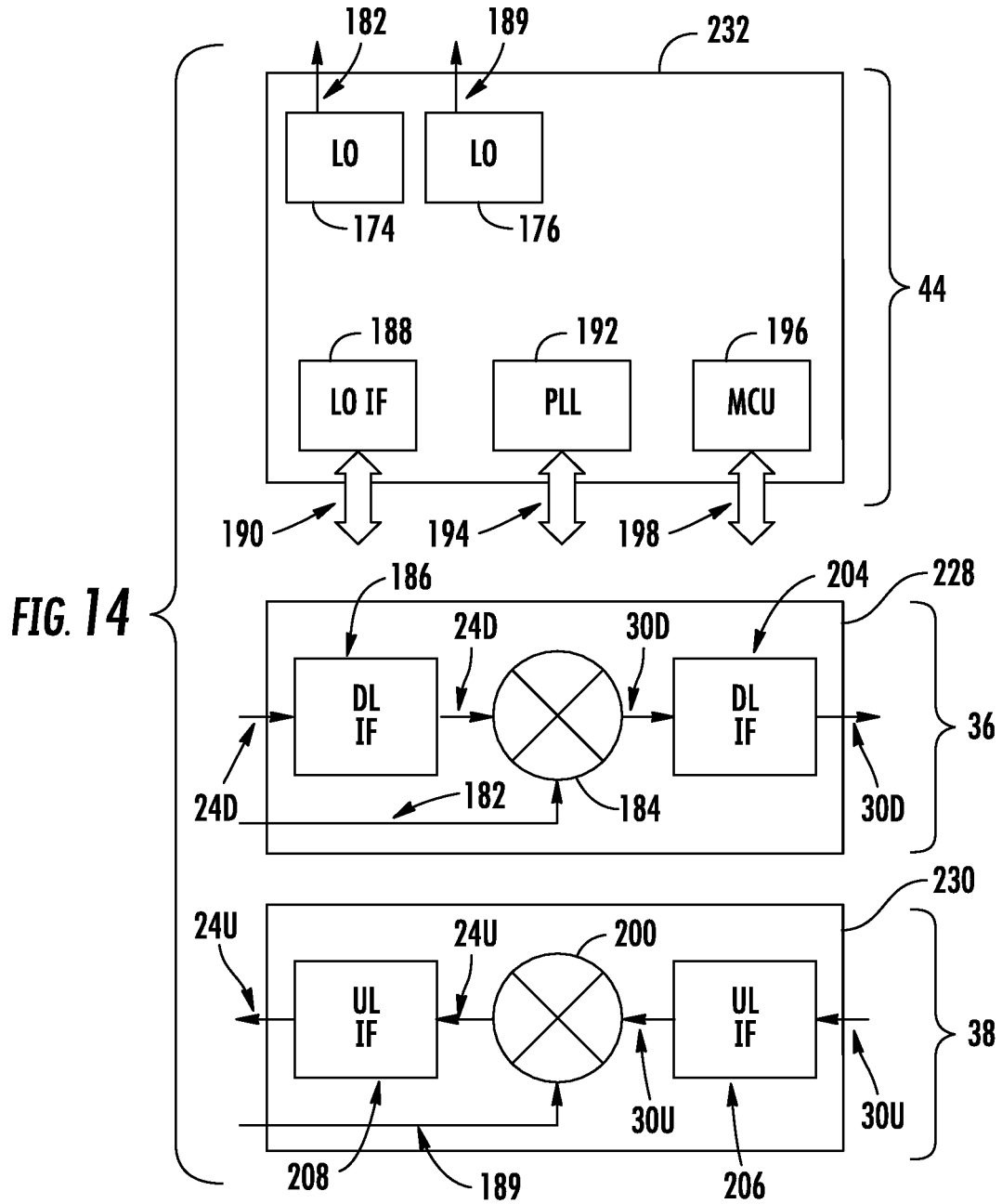

FIG. 13 illustrates yet another alternative embodiment of a RFIC chip configuration for a remote unit (RU) 12, for a single radio band. In this embodiment, the UC 36, the DC 38, and the synthesizer circuitry 44 for a single band are all included in the same RFIC chip 226. In yet another embodiment as illustrated in FIG. 14, the UC 36, the DC 38, and the synthesizer circuitry 44 supporting a single radio band are provided in separate RFIC chips 228, 230, and 232, respectively.

The above examples of distributed antenna systems are not limited to frequency shifting of communications signals or to a particular frequency shifting scheme. The downlink communication signals could be frequency upconverted or downconverted. The uplink signals could be frequency upconverted or downconverted.

Figure 15:
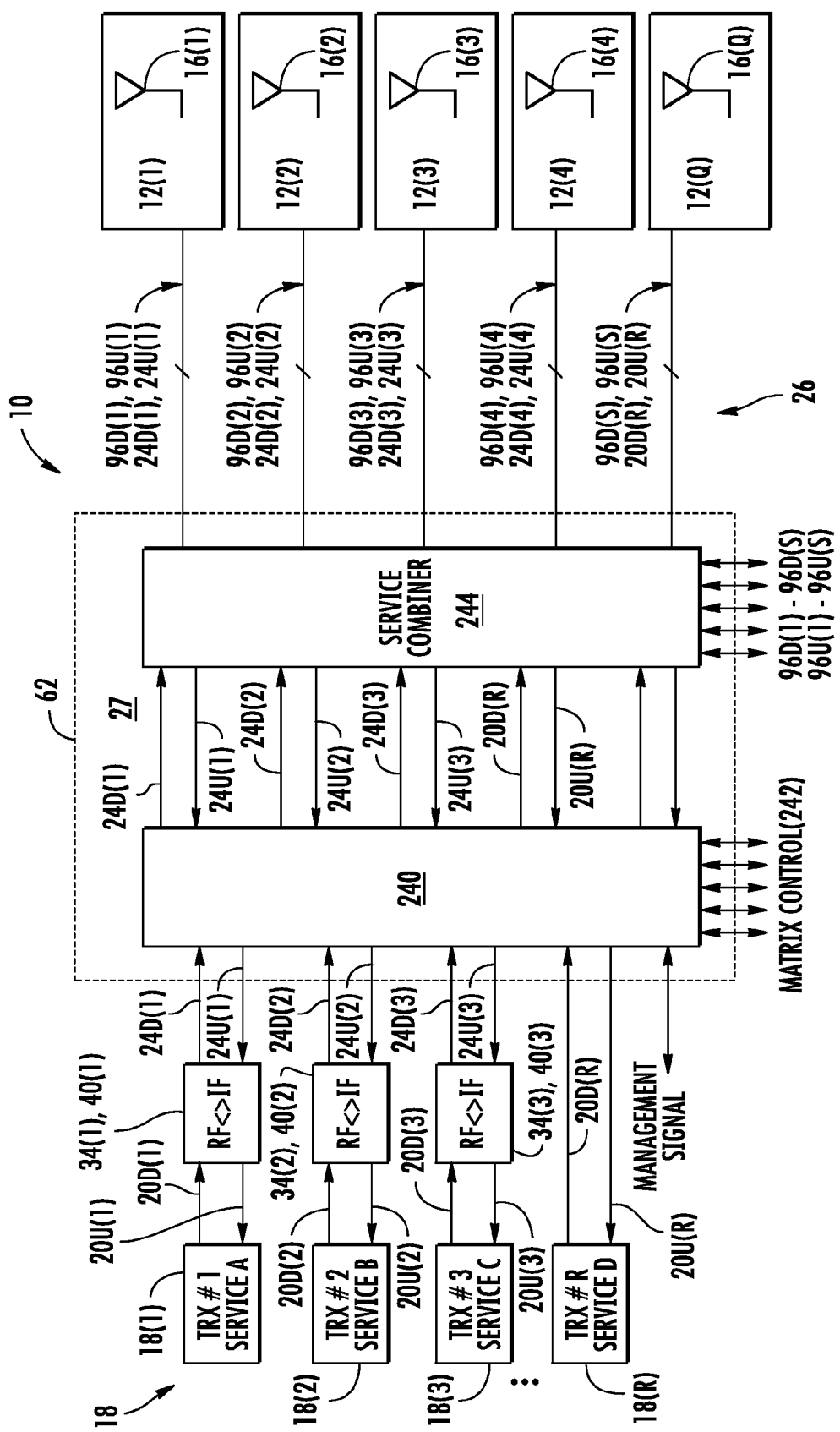
FIG. 15 is a schematic diagram of another exemplary distributed antenna system that includes a distributed WLAN system for providing digital data services and a distributed RF communications system employing a RFIC chip switching matrix for providing switched RF communications services to RUs.

FIG. 15 is a schematic diagram of the exemplary distributed antenna system 10 in FIG. 1, but employing a switching matrix 240 in the communications interface 27 for providing multiple switched RF communications services and/or digital data services to any of a plurality of RUs 12(1)-12(Q), where Q signifies any number of RUs 12. The switching matrix 240 is disposed in the communications interface RFIC chip 62 in this embodiment. The RUs 12(1)-12(Q) may be AP, like the APs 102 in the distributed antenna system 80 in FIG. 2, that are capable of supporting RF communication services and digital data services. With continuing reference to FIG. 15, common element numbers between components in the distributed antenna system 10' in FIG. 4 and the distributed antenna system 10 in FIG. 1 denote common elements and functionality, and thus will not be re-described. The notations (1)-(4) signify common elements, but four of the elements provided, to support four transmissions from the radio interface 18 of up to four RF communications switched to any of the RUs 12(1)-12(R) desired.

The distributed antenna system 10 in FIG. 15 shows RUs 12(1)-12(Q) supporting both RF communications services and digital data services. The switching matrix 240 can be configured through the matrix control signals 242 to provide (i.e., switch) any combination of the RF communication services from the radio interfaces 18(1)-18(R) to the RUs 12(1)-12(Q). As a non-limiting example, one radio interface 18(R) provides RF communication services over downlink RF communications signals 20D(R) that are not frequency shifted. A service combiner 244 is provided to combine any of the RF communications services switched by the switching matrix 240 (i.e., downlink RF communications signals 24D(1)-24D(3) and 20D(R)) with downlink digital data signals 96D(1)-96D(S) to be provided over the communications medium 26 to the RUs 12(1)-12(Q) according to the configured switching in the switching matrix. In this manner, the matrix control signals 242 can control which RUs 12(1)-12(Q) receive which RF communications services from the radio interfaces 18(1)-18(R).

Figure 16:
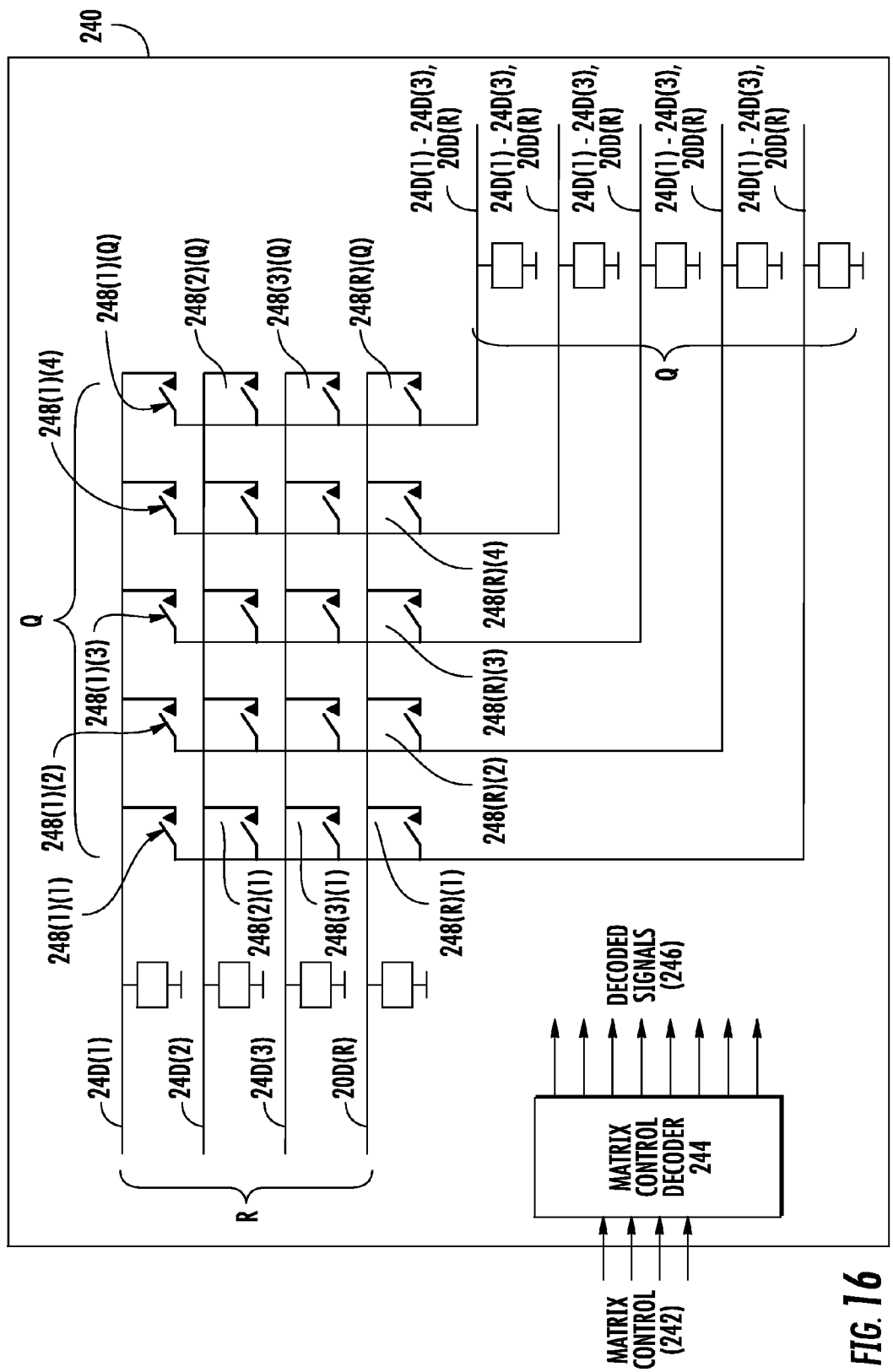
FIG. 16 is a schematic diagram of an intermediate frequency (IF) switching matrix employing a RFIC chip for providing switched RF communications services to RUs, and that may be provided as the switching matrix in the system in FIG. 15.

FIG. 16 is a schematic diagram of the switching matrix 120 illustrating more detail regarding the switching provided therein. FIG. 16 only illustrates the switching circuitry in the switching matrix 240 for downlink RF communications services, but the same principles can apply for uplink RF communications services as well. As previously discussed, the switching matrix can be employed in communications interface RFIC chip 62 (FIG. 15) for switching RF communications services to the RUs 12(1)-12(Q). As illustrated in FIG. 16, the switching matrix 240 includes a matrix control decoder 244 that receives the matrix control signals 242 to provide decoded switching signals 246. The decoded switching signals 246 control the matrix of switches 248. The matrix of switches is designed to switch any combination of the downlink RF communications signals 24D(1)-24D(3), 20D(R) to any RU 12(1)-12(Q). In this example, the switching matrix 240 is two-dimensional matrix of R×Q size, where R is the number of downlink RF communication services, and Q is the number of RUs 12.

Figure 17:
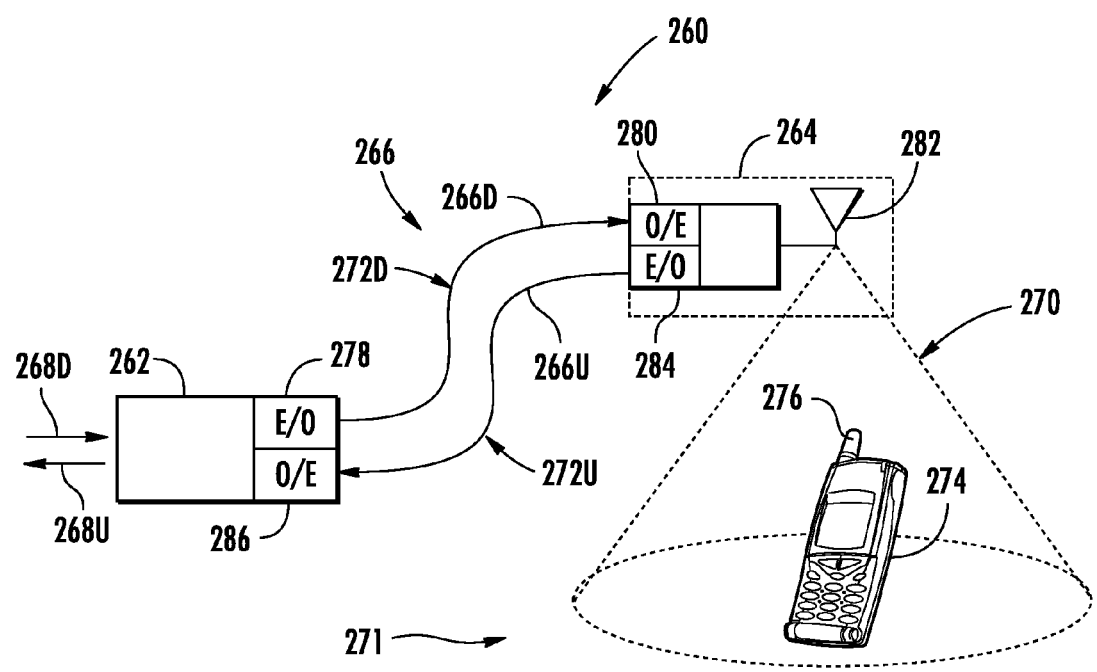
FIG. 17 is a schematic diagram of an exemplary optical fiber-based distributed antenna system that can include RFIC chips to provide RF communications services.

The distributed antenna systems that can employ the RFIC chip(s) disclosed herein can employ other communications mediums other than electrical conductors. For example, the communications mediums could also include wireless transmission and reception and/or optical fiber. FIG. 17 is a schematic diagram of an embodiment of another distributed antenna system that may employ an RFIC chip (s). In this embodiment, the distributed antenna system is an optical fiber-based distributed antenna system 260. The optical fiber-based distributed antenna system 260 is configured to create one or more antenna coverage areas for establishing communications with wireless client devices located in the RF range of the antenna coverage areas. The system 260 provides RF communication services (e.g., cellular services). In this embodiment, the optical fiber-based distributed antenna system 260 includes central unit 262, one or more RUs 264, and an optical fiber 266 that optically couples the central unit 262 to the RU 264. Also by employing the switching matrix 240, it may be possible to identify which RU 264 is communicating with or closest to a subscriber. For example, see U.S. PCT Application No. US11/29895 filed on Mar. 25, 2011 and entitled "Localization Services in Optical Fiber-Based Distributed Communication Components and Systems, and Related Methods," and U.S. PCT Application No. US11/49122 filed on Aug. 25, 2011 entitled "Localization of Wireless Handheld Devices in Distributed Antenna Systems by Signal Delay," both of which are incorporated by reference.

The RU 264 is a type of remote communications unit. In general, a remote communications unit can support either wireless communications, wired communications, or both. The RU 264 can support wireless communications and may also support wired communications. The central unit 262 is configured to receive communications over downlink electrical RF signals 268D from a source or sources, such as a network or carrier as examples, and provide such communications to the RU 264. The central unit 262 is also configured to return communications received from the RU 264, via uplink electrical RF signals 268U, back to the source(s). In this regard in this embodiment, the optical fiber 266 includes at least one downlink optical fiber 266D to carry signals communicated from the central unit 262 to the RU 264 and at least one uplink optical fiber 266U to carry signals communicated from the RU 264 back to the central unit 262. The downlink optical fiber 266D and uplink optical fiber 266U could be provided as the same fiber employing wave division multiplexing (WDM) as an example.

One downlink optical fiber 266D and one uplink optical fiber 266U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the optical fiber-based distributed antenna system 260 either in conjunction with RF communications signals or not.

The optical fiber-based distributed antenna system 260 has an antenna coverage area 270 that can be disposed about the RU 264. The antenna coverage area 270 of the RU 264 forms an RF coverage area 271. The central unit 262 is adapted to perform or to facilitate any one of a number of Radio-over-Fiber (RoF) applications, such as RF identification (RFID), wireless local-area network (WLAN) communication, or cellular phone service. Shown within the antenna coverage area 270 is a wireless client device 274 in the form of a mobile device as an example, which may be a cellular telephone as an example. The wireless client device 274 can be any device that is capable of receiving RF communications signals. The wireless client device 274 includes an antenna 276 (e.g., a wireless card) adapted to receive and/or send electromagnetic RF signals. As previously discussed above, it may be typical for the antenna 276 of the wireless client device 274 to be oriented perpendicular or substantially perpendicular to the ground during use such that the antenna 276 has a vertical polarization to the ground.

With continuing reference to FIG. 17, to communicate the electrical RF signals over the downlink optical fiber 266D to the RU 264, to in turn be communicated to the wireless client device 274 in the antenna coverage area 270 formed by the RU 264, the central unit 262 includes a radio interface in the form of an electrical-to-optical (E/O) converter 278. The E/O converter 278 converts the downlink electrical RF signals 268D to downlink optical RF signals 272D to be communicated over the downlink optical fiber 266D. The RU 264 includes an optical-to-electrical (O/E) converter 280 to convert received downlink optical RF signals 272D back to electrical RF signals to be communicated wirelessly through a selected antenna 282 of the RU 264 to wireless client devices 274 located in the antenna coverage area 270. The selected antenna 282 used in communication to the wireless client device 274 may be selected according to an automatic antenna selection arrangement, including the distributed antenna system 10 disclosed herein that is included in the RU 264.

Similarly, the selected antenna 282 is also configured to receive wireless RF communications from wireless client devices 274 in the antenna coverage area 270. In this regard, the selected antenna 282 receives wireless RF communications from wireless client devices 274 and communicates electrical RF signals representing the wireless RF communications to an E/O converter 284 in the RU 264. The E/O converter 284 converts the electrical RF signals into uplink optical RF signals 272U to be communicated over the uplink optical fiber 266U. An O/E converter 286 provided in the central unit 262 converts the uplink optical RF signals 272U into uplink electrical RF signals, which can then be communicated as uplink electrical RF signals 268U back to a network or other source. The central unit 262 in this embodiment is not able to distinguish the location of the wireless client devices 274 in this embodiment. The wireless client device 274 could be in the range of any antenna coverage area 270 formed by an RU 264.

In a typical cellular system, for example, a plurality of BTSs are deployed at a plurality of remote locations to provide wireless telephone coverage. Each BTS serves a corresponding cell and when a mobile wireless client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples.

The optical fiber-based distributed antenna system 260 in FIG. 17 may be configured to support distribution of both radio-frequency (RF) communication services and digital data services. The RF communication services and digital data services may be provided over optical fiber to wireless client devices 274 through the RUs 264. For example, non-limiting examples of digital data services include WLAN, WiMax, WiFi, Digital Subscriber Line (DSL), and LTE, etc. Digital data services can also be provided over optical fiber separate from optical fiber 266D, 266U providing RF communication services. Alternatively, digital data services can be provided over common optical fiber 266D, 266U with RF communication services. For example, digital data services can be provided over common optical fiber 266D, 266U with RF communication services at different wavelengths through WDM and/or at different frequencies through FDM. Power provided in the distributed antenna system to provide power to remote units can also be accessed to provide power to digital data service components.

Figure 18:
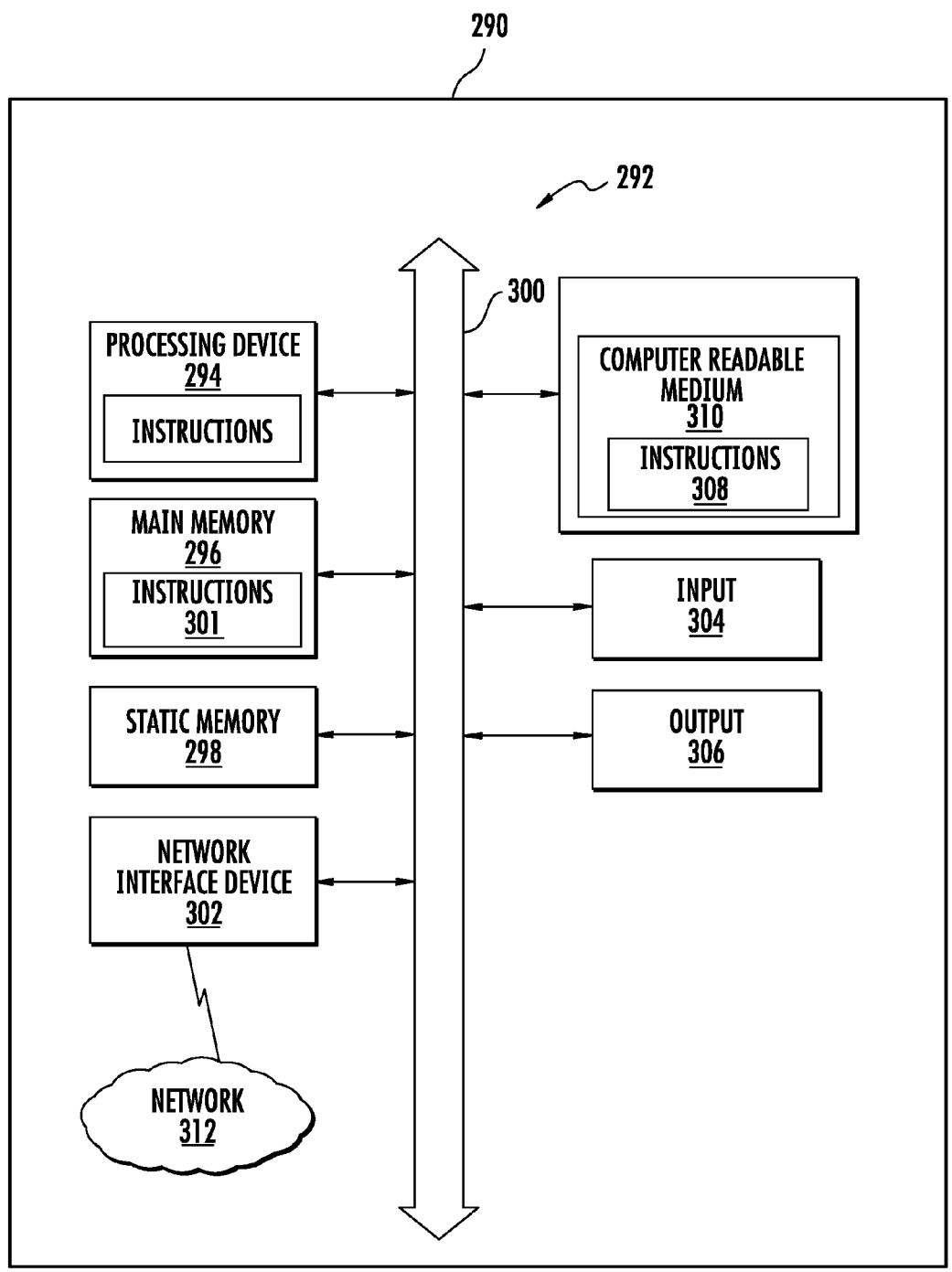
FIG. 18 is a schematic diagram of a generalized representation of a computer system that can be included in or interface with any of the RFIC chips described herein.

Any of the distributed antenna system components disclosed herein can include a computer system. In this regard, FIG. 18 is a schematic diagram representation of additional detail regarding an exemplary form of an exemplary computer system 290 that is adapted to execute instructions from an exemplary computer-readable medium to perform power management functions and can be included in a distributed antenna system component(s). In this regard, the computer system 290 includes a set of instructions for causing the distributed antenna system component(s) to provided its designed functionality. The distributed antenna system component(s) may be connected (e.g., networked) to other machines in a LAN, an intranet, an extranet, or the Internet. The distributed antenna system component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The distributed antenna system component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 290 in this embodiment includes a processing device or processor 294, a main memory 296 (e.g., read-only memory (ROM), flash memory, dynamic random access memory (DRAM) such as synchronous DRAM (SDRAM), etc.), and a static memory 298 (e.g., flash memory, static random access memory (SRAM), etc.), which may communicate with each other via the data bus 300. Alternatively, the processing device 294 may be connected to the main memory 296 and/or static memory 298 directly or via some other connectivity means. The processing device 294 may be a controller, and the main memory 296 or static memory 298 may be any type of memory, each of which can be included in the central unit 262.

The processing device 294 represents one or more general-purpose processing devices such as a microprocessor, central processing unit, or the like. More particularly, the processing device 294 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 294 is configured to execute processing logic in instructions 301 for performing the operations and steps discussed herein.

The computer system 290 may further include a network interface device 302. The computer system 290 also may or may not include an input 304 to receive input and selections to be communicated to the computer system 290 when executing instructions. The computer system 290 also may or may not include an output 306, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 290 may or may not include a data storage device that includes instructions 308 stored in a computer-readable medium 310. The instructions 308 may also reside, completely or at least partially, within the main memory 296 and/or within the processing device 294 during execution thereof by the computer system 290, the main memory 296 and the processing device 294 also constituting computer-readable medium. The instructions 301 may further be transmitted or received over a network 312 via the network interface device 302.

While the computer-readable medium 310 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals.

Many modifications and other embodiments of the embodiments set forth herein will come to mind to one skilled in the art to which the embodiments pertain having the benefit of the teachings presented in the foregoing descriptions and the associated drawings. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method for providing communications signals in a central unit in a distributed antenna system, comprising:
    receiving downlink radio-frequency (RF) communication signals at a RF communications frequency for a RF communications service in a communications interface;
    receiving uplink RF communication signals at the RF communications frequency for the RF communications service in the communications interface;
    shifting a frequency of the downlink RF communication signals to an intermediate frequency (IF) having a different frequency than the RF communications frequency, to provide downlink IF communications signals in a first frequency conversion circuitry;
    shifting the frequency of uplink IF communication signals to the RF communications frequency to provide the uplink RF communications signals in a second frequency conversion circuitry, wherein at least one of the first frequency conversion circuitry and the second frequency conversion circuitry are provided in at least one RF integrated circuit (IC) (RFIC) chip;
    receiving second downlink RF communication signals at a second RF communications frequency for a second RF communications service in the communications interface;
    receiving second uplink RF communication signals at the second RF communications frequency for the second RF communications service in the communications interface;
    shifting the frequency of the second downlink RF communication signals to a second IF having a different frequency than the second RF communications frequency, in a third frequency conversion circuitry provided in the at least one RFIC chip, to provide second downlink IF communications signals; and
    shifting the frequency of second uplink IF communication signals to the second RF communications frequency in a fourth frequency conversion circuitry provided in the at least one RFIC chip, to provide the second uplink RF communications signals.

2. The method of claim 1, comprising a communications interface comprising communications circuitry provided in a communications interface RFIC chip, the communications circuitry configured to:

receive the downlink IF communications signals in the communications interface;
provide the downlink IF communications signals from the communications interface to one or more remote units (RUs);
receive the uplink IF communication signals from the one or more RUs in the communications interface; and
provide the uplink IF communication signals from the communications interface to the at least one RFIC chip.

3. The method of claim 2, further comprising:
synthesizing in synthesizer circuitry in the at least one RFIC chip, at least one first local oscillator (LO) signal and at least one second LO signal;
providing the first LO signal to the at least one RFIC chip; and
providing the second LO signal to the at least one RFIC chip.

4. The method of claim 3, wherein the at least one RFIC chip comprises a synthesizer RFIC chip comprising the synthesizer circuitry.

5. A method for providing communications signals in a central unit in a distributed antenna system, comprising:
receiving downlink radio-frequency (RF) communication signals at a RF communications frequency for a RF communications service in a communications interface;
receiving uplink RF communication signals at the RF communications frequency for the RF communications service in the communications interface;
shifting a frequency of the downlink RF communication signals to an intermediate frequency (IF) having a different frequency than the RF communications frequency, to provide downlink IF communications signals in a first frequency conversion circuitry;
shifting the frequency of uplink IF communication signals to the RF communications frequency to provide the uplink RF communications signals in a second frequency conversion circuitry, wherein
at least one of the first frequency conversion circuitry and the second frequency conversion circuitry are provided in at least one RF integrated circuit (IC) (RFIC) chip,
the downlink RF communication signals are comprised of MIMO downlink RF communication signals,
the uplink RF communications signals are comprised of MIMO uplink RF communication signals,
the downlink IF communication signals are comprised of MIMO downlink IF communication signals, and
the uplink IF communications signals are comprised of MIMO uplink IF communications signals;
receiving second MIMO downlink RF communication signals at the RF communications frequency for the RF communications service in the communications interface;
receiving second MIMO uplink RF communication signals at the RF communications frequency for the RF communications service in the communications interface;
shifting the frequency of the second MIMO downlink RF communication signals to a second intermediate frequency (IF) having a different frequency than the RF communications frequency in a third frequency conversion circuitry provided in the at least one RFIC chip, to provide second MIMO downlink IF communications signals; and
shifting the frequency of second MIMO uplink IF communication signals to the RF communications frequency in a fourth frequency conversion circuitry provided in the at least one RFIC chip, to provide the second MIMO uplink RF communications signals.

6. A method of providing received communications signals in a remote unit (RU), comprising:
receiving downlink intermediate frequency (IF) communication signals at an IF for a radio-frequency (RF) communications service in a RF communications interface;
receiving uplink RF communication signals at a RF communications frequency for a RF communications service in a RF communications interface;
shifting a frequency of downlink IF communication signals to the RF communications frequency of the RF communications service in a first frequency conversion circuitry provided in at least one RF integrated circuit (IC) (RFIC) chip, to radiate downlink RF communications signals over a first antenna element;
shifting the frequency of uplink RF communication signals received from a second antenna element to the IF in a second frequency conversion circuitry provided in the at least one RFIC chip, to provide uplink IF communications signals;
receiving second downlink intermediate frequency (IF) communication signals at a second IF for a second RF communications service in the RF communications interface;
receiving second uplink RF communication signals at a second RF communications frequency for the second RF communications service;
shifting the frequency of the second downlink IF communication signals to the second RF communications frequency of second RF communications service in a third frequency conversion circuitry provided in the at least one RFIC chip, to radiate a second downlink RF communications signals over a third antenna element; and
shifting the frequency of second uplink RF communication signals received from a fourth antenna element to the second IF in a fourth frequency conversion circuitry provided in the at least one RFIC chip, to provide second uplink IF communications signals.

7. The method of claim 6, further comprising synthesizing, in synthesizer circuitry provided in a synthesizer RFIC chip, at least one first local oscillator (LO) signal provided to a first RFIC chip, and at least one second LO signal provided to a second RFIC chip.

8. The method of claim 7, further comprising:
receiving in the first frequency conversion circuitry the at least one first frequency conversion LO signal to shift the frequency of the downlink IF communication signals to the RF communications frequency to provide the downlink RF communications signals; and
receiving in the second frequency conversion circuitry the at least one second LO signal to shift the frequency of the uplink RF communication signals to the IF to provide the uplink IF communications signals.

9. A method of providing received communications signals in a remote unit (RU), comprising:
receiving downlink intermediate frequency (IF) communication signals at an IF for a radio-frequency (RF) communications service in a RF communications interface;
receiving uplink RF communication signals at a RF communications frequency for a RF communications service in a RF communications interface;

shifting a frequency of downlink IF communication signals to the RF communications frequency of the RF communications service in a first frequency conversion circuitry provided in at least one RF integrated circuit (IC) (RFIC) chip, to radiate downlink RF communications signals over a first antenna element;

shifting the frequency of uplink RF communication signals received from a second antenna element to the IF in a second frequency conversion circuitry provided in the at least one RFIC chip, to provide uplink IF communications signals, wherein
the downlink RF communication signals are comprised of MIMO downlink RF communication signals,
the uplink RF communications signals are comprised of MIMO uplink RF communication signals,
the downlink IF communication signals are comprised of MIMO downlink IF communication signals, and
the uplink IF communications signals are comprised of MIMO IF communications signals;

receiving second downlink intermediate frequency (IF) communication signals at a second IF for the RF communications service in the communications interface;

receiving second uplink RF communication signals at the RF communications frequency for the RF communications service;

shifting the frequency of the second downlink IF communication signals to the RF communications frequency of RF communications service in a third frequency conversion circuitry provided in the at least one RFIC chip, to radiate the second downlink RF communications signals over a third antenna element; and shifting the frequency of second uplink RF communication signals received from a fourth antenna element to the second IF in a fourth frequency conversion circuitry provided in the at least one RFIC chip, to provide second uplink IF communications signals.

10. The method of claim 9, wherein the IF and the second IF do not overlap.

11. A remote unit (RU) for providing received communications signals in a distributed antenna system, comprising:
a radio-frequency (RF) communications interface configured to:
receive downlink intermediate frequency (IF) communication signals at an IF for a RF communications service over a communications medium from a central unit; and
receive uplink RF communication signals at a RF communications frequency for the RF communications service;
at least one RF integrated circuit (IC) (RFIC) chip comprising at least one of:
a first frequency conversion circuitry configured to shift a frequency of downlink IF communication signals to a RF communications frequency of RF communications service to radiate downlink RF communications signals over a first antenna element; and
a second frequency conversion circuitry configured to shift the frequency of uplink RF communication signals received from a second antenna element to the IF to provide uplink IF communications signals;
a communications interface comprising communications circuitry configured to receive the downlink IF communication signals from the central unit and provide the downlink IF communication signals to an up conversion RFIC chip, receive the uplink IF communication signals and provide the uplink IF communications signals to the central unit, wherein the communications interface further comprises a switching matrix configured to switch received uplink IF communications signals to selected communications interfaces of the central unit; and
synthesizer circuitry configured to generate at least one first local oscillator (LO) signal provided to the at least one RFIC chip and generate at least one second LO signal provided to the at least one RFIC chip.

12. The RU of claim 11, wherein:
the first frequency conversion circuitry is further configured to receive the at least one first LO signal to shift the frequency of the downlink IF communication signals to the RF communications frequency to provide the downlink RF communications signals; and
the second frequency conversion circuitry is further configured to receive the at least one second LO signal to shift the frequency of the uplink RF communication signals to the IF to provide the uplink IF communications signals.

13. The RU of claim 11, further comprising:
a second communications interface configured to:
receive second downlink intermediate frequency (IF) communication signals at a second IF for a second RF communications service; and
receive second uplink RF communication signals at a second RF communications frequency for the second RF communications service;
at least one second RFIC chip comprising at least one of:
a third frequency conversion circuitry configured to shift the frequency of the second downlink IF communication signals to the second RF communications frequency of the RF communications service to radiate second downlink RF communications signals over a third antenna element; and
a fourth frequency conversion circuitry configured to shift the frequency of second uplink RF communication signals received from a fourth antenna element to the second IF to provide second uplink IF communications signals.

14. The RU of claim 11, wherein:
the downlink RF communication signals are comprised of MIMO downlink RF communication signals,
the uplink RF communications signals are comprised of MIMO uplink RF communication signals,
the downlink IF communication signals are comprised of MIMO downlink IF communication signals, and
the uplink IF communications signals are comprised of MIMO IF communications signals; and further comprising:
the RF communications interface is configured to:
receive second MIMO downlink IF communication signals at the IF communications frequency for the RF communications service; and
receive second MIMO uplink IF communication signals at the IF for the RF communications service;
at least one second RFIC chip comprising at least one of:
a third frequency conversion circuitry configured to shift the frequency of second downlink IF communication signals to the RF communications frequency to radiate the second downlink RF communications signals over a third antenna element; and
a fourth frequency conversion circuitry configured to shift the frequency of second uplink RF communication signals received from a fourth antenna element to the second IF to provide second uplink IF communications signals.

\* \* \* \* \*